United States Patent
Liu et al.

(10) Patent No.: US 11,251,845 B2
(45) Date of Patent: Feb. 15, 2022

(54) CHANNEL INFORMATION SENDING METHOD, DATA SENDING METHOD, AND DEVICE

(71) Applicant: HUAWEI TECHNOLOGIES CO.,LTD., Guangdong (CN)

(72) Inventors: Kunpeng Liu, Beijing (CN); Di Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/940,201

(22) Filed: Jul. 27, 2020

(65) Prior Publication Data

US 2020/0358497 A1 Nov. 12, 2020

Related U.S. Application Data

(63) Continuation of application No. 16/188,911, filed on Nov. 13, 2018, now Pat. No. 10,727,916, which is a
(Continued)

(51) Int. Cl.
 *H04B 7/0456* (2017.01)
 *H04L 1/06* (2006.01)
(Continued)

(52) U.S. Cl.
 CPC .......... *H04B 7/0478* (2013.01); *H04B 7/043* (2013.01); *H04B 7/0408* (2013.01);
(Continued)

(58) Field of Classification Search
 CPC .. H04B 7/0478; H04B 7/0408; H04B 7/0469; H04B 7/0695; H04B 7/043;
(Continued)

(56) References Cited

U.S. PATENT DOCUMENTS 4,238,746 A * 12/1980 McCool .................. G01S 13/52
 333/165
6,665,308 B1 * 12/2003 Rakib ................... H03M 13/256
 348/E7.07
(Continued)

FOREIGN PATENT DOCUMENTS

CN 102132502 A 7/2011
CN 102273091 A 12/2011
(Continued)

OTHER PUBLICATIONS

R1-102251,3GPP TSG RAN WG1 Meeting #60bis, Philips:"Deriving explicit channel information from PMI", Beijing, China, Apr. 12-16, 2010. 2 pages. XP50419513.
(Continued)

*Primary Examiner* — Berhanu Tadese

(57) ABSTRACT

A channel information sending method, a data sending method, and a device are provided, to improve feedback precision of a precoding matrix. These include a receiver that receives a reference signal and a memory, configured to store at least one computer instruction which, when executed by the processor, cause the processor to measure the reference signal from the receiver to obtain first channel information and second channel information and send the first channel information and the second channel information to the second device. In some embodiments, the first channel information comprises identification information of N antenna ports in M antenna ports for the reference signal, M is an integer not less than 2, and N is a positive integer not greater than M, the second channel information comprises information about a weighted combination factor used for performing weighted combination on the N antenna ports, the weighted combination factor comprises an amplitude factor and a phase factor, and the first channel infor-
(Continued)

mation and the second channel information are used to constitute a precoding matrix.

23 Claims, 12 Drawing Sheets

Related U.S. Application Data continuation of application No. PCT/CN2017/083978, filed on May 11, 2017.

(51) Int. Cl.
    *H04B 7/0408*     (2017.01)
    *H04B 7/06*     (2006.01)
    *H04B 7/0426*     (2017.01)

(52) U.S. Cl.
    CPC ......... *H04B 7/0469* (2013.01); *H04B 7/0626* (2013.01); *H04B 7/0634* (2013.01); *H04B 7/0695* (2013.01); *H04L 1/06* (2013.01)

(58) Field of Classification Search
    CPC .... H04B 7/0626; H04B 7/0634; H04B 17/30; H04B 7/0456; H04B 7/0621; H04B 7/063; H04B 7/0639; H04L 1/0009; H04L 1/0026; H04L 1/0076; H04L 1/06; H04L 1/0675; H04W 72/1221; H04W 72/1231
    See application file for complete search history.

(56) References Cited

U.S. PATENT DOCUMENTS

| | | | | |
|---|---|---|---|---|
| 7,085,223 B2* | 8/2006 | Izumi | ................. | H04L 27/2628 370/204 |
| 7,414,959 B2* | 8/2008 | Izumi | ................. | H04B 7/0842 370/203 |
| 7,633,848 B2* | 12/2009 | Izumi | ................. | H04B 7/066 370/204 |
| 7,660,607 B2* | 2/2010 | Oh | ................. | H04B 7/0639 455/562.1 |
| 7,957,258 B2* | 6/2011 | Izumi | ................. | H04B 7/0857 370/204 |
| 7,961,588 B2* | 6/2011 | Izumi | ................. | H04B 7/0615 370/204 |
| 8,040,865 B2* | 10/2011 | Ohm | ................. | H04B 7/0452 370/338 |
| 8,295,772 B2* | 10/2012 | Petersson | ................. | H04B 7/10 455/63.1 |
| 8,355,424 B2* | 1/2013 | Xi | ................. | H04B 7/0456 375/144 |
| 8,509,338 B2* | 8/2013 | Sayana | ................. | H04B 7/0639 375/267 |
| 8,588,799 B2* | 11/2013 | Lv | ................. | H04B 7/0639 455/450 |
| 8,665,990 B2* | 3/2014 | Xi | ................. | H04B 7/0617 375/295 |
| 8,693,567 B2* | 4/2014 | Zhou | ................. | H04B 7/0632 375/267 |
| 8,693,574 B2* | 4/2014 | Mizuta | ................. | H04B 7/0456 375/295 |
| 8,743,675 B2* | 6/2014 | Izumi | ................. | H04B 7/0615 370/204 |
| 8,928,459 B2* | 1/2015 | Cyganski | ................. | G01S 5/02 340/8.1 |
| 8,942,302 B2* | 1/2015 | Krishnamurthy | .... | H04B 7/0478 375/260 |
| 8,971,437 B2* | 3/2015 | Brown | ................. | H04B 7/0469 375/267 |
| 8,976,884 B2* | 3/2015 | Krishnamurthy | ...... | H04B 7/063 375/267 |
| 9,019,849 B2* | 4/2015 | Hui | ................. | H04B 7/0617 370/252 |
| 9,059,761 B2* | 6/2015 | Seo | ................. | H04L 5/0023 |
| 9,143,213 B2* | 9/2015 | Xi | ................. | H04L 1/0625 |
| 9,184,806 B2* | 11/2015 | Kim | ................. | H04B 7/0456 |
| 9,203,489 B2* | 12/2015 | Sayana | ................. | H04B 7/0478 |
| 9,203,491 B2* | 12/2015 | Wang | ................. | H04B 7/0617 |
| 9,332,528 B2* | 5/2016 | Kim | ................. | H04L 25/03343 |
| 9,362,997 B2* | 6/2016 | Kim | ................. | H04B 7/0617 |
| 9,397,736 B2* | 7/2016 | Zhu | ................. | H04B 7/0626 |
| 9,401,750 B2* | 7/2016 | Sayana | ................. | H04B 7/0456 |
| 9,435,893 B2* | 9/2016 | Chang | ................. | H01Q 25/00 |
| 9,438,324 B2* | 9/2016 | Ohm | ................. | H04B 7/0417 |
| 9,455,806 B2* | 9/2016 | Izumi | ................. | H04B 7/0615 |
| 9,596,059 B2* | 3/2017 | Izumi | ................. | H04L 5/0058 |
| 9,667,378 B2* | 5/2017 | Jongren | ................. | H04B 7/0634 |
| 9,769,798 B2* | 9/2017 | Yu | ................. | H04W 72/04 |
| 9,793,971 B2* | 10/2017 | Ko | ................. | H04L 5/0048 |
| 9,813,133 B2* | 11/2017 | Ko | ................. | H04B 7/0665 |
| 9,866,303 B2* | 1/2018 | Ko | ................. | H04B 7/0639 |
| 9,954,592 B2* | 4/2018 | Ko | ................. | H04B 7/0469 |
| 9,954,710 B2* | 4/2018 | Izumi | ................. | H04B 7/0613 |
| 10,003,486 B2* | 6/2018 | Zhu | ................. | H04L 1/0009 |
| 10,004,030 B2* | 6/2018 | Liu | ................. | H04W 48/12 |
| 10,009,088 B2 | 6/2018 | Rahman et al. | | |
| 10,129,307 B2 | 11/2018 | Negaluguli et al. | | |
| 10,455,590 B2* | 10/2019 | Zarifi | ................. | H04B 7/024 |
| 10,727,916 B2* | 7/2020 | Liu | ................. | H04B 7/0626 |
| 2002/0097668 A1* | 7/2002 | Izumi | ................. | H04L 5/0044 370/208 |
| 2003/0163644 A1* | 8/2003 | Hoang | ................. | G06F 12/128 711/136 |
| 2005/0063475 A1* | 3/2005 | Bhaskaran | ........... | H04N 19/117 375/240.29 |
| 2006/0028977 A1* | 2/2006 | Izumi | ................. | H04B 7/0613 370/203 |
| 2006/0072682 A1* | 4/2006 | Kent | ................. | H04B 1/7097 375/267 |
| 2006/0072683 A1* | 4/2006 | Kent | ................. | H04L 25/0214 375/267 |
| 2006/0073790 A1* | 4/2006 | Kent | ................. | H04B 7/0857 455/67.11 |
| 2006/0074612 A1* | 4/2006 | Kent | ................. | H04B 7/0857 703/2 |
| 2006/0098568 A1* | 5/2006 | Oh | ................. | H04B 7/0634 370/206 |
| 2007/0064825 A1* | 3/2007 | Izumi | ................. | H04L 27/2628 375/260 |
| 2008/0013644 A1 | 1/2008 | Hugl et al. | | |
| 2009/0197544 A1* | 8/2009 | Petersson | ................. | H04B 7/10 455/73 |
| 2009/0325496 A1* | 12/2009 | Ohm | ................. | H04B 7/0452 455/63.1 |
| 2010/0020709 A1* | 1/2010 | Ohm | ................. | H04B 7/0417 370/252 |
| 2010/0039924 A1* | 2/2010 | Izumi | ................. | H04B 7/0613 370/203 |
| 2010/0074377 A1* | 3/2010 | Izumi | ................. | H04B 7/0857 375/340 |
| 2010/0277339 A1* | 11/2010 | Cyganski | ................. | G01S 1/026 340/8.1 |
| 2010/0318368 A1* | 12/2010 | Thumpudi | ............ | G10L 19/008 704/500 |
| 2010/0323612 A1* | 12/2010 | Xu | ................. | H04B 7/022 455/7 |
| 2011/0025560 A1* | 2/2011 | Crozzoli | ............... | H04B 7/0854 342/373 |
| 2011/0080901 A1* | 4/2011 | Lin | ................. | H04L 25/03343 370/344 |
| 2011/0080972 A1* | 4/2011 | Xi | ................. | H04B 7/0623 375/267 |
| 2011/0205930 A1* | 8/2011 | Rahman | ................. | H04B 7/0417 370/252 |
| 2011/0211654 A1* | 9/2011 | Izumi | ................. | H04B 7/0626 375/295 |
| 2011/0274188 A1* | 11/2011 | Sayana | ................. | H04B 7/0639 375/260 |

(56) References Cited

U.S. PATENT DOCUMENTS

| | | | |
|---|---|---|---|
| 2012/0003945 A1* | 1/2012 | Liu | H04L 1/0026 455/115.1 |
| 2012/0063344 A1* | 3/2012 | Ohm | H04B 7/0452 370/252 |
| 2012/0163439 A1* | 6/2012 | Zhou | H04B 7/0417 375/224 |
| 2012/0258763 A1* | 10/2012 | Bjorkegren | H04W 52/246 455/522 |
| 2012/0300864 A1* | 11/2012 | Merlin | H04B 7/0857 375/260 |
| 2012/0328031 A1* | 12/2012 | Pajukoski | H04B 7/0469 375/259 |
| 2013/0114468 A1* | 5/2013 | Hui | H04B 17/345 370/277 |
| 2013/0129010 A1* | 5/2013 | Xi | H04L 27/362 375/295 |
| 2013/0136199 A1* | 5/2013 | Wan | H04L 25/0226 375/260 |
| 2013/0242778 A1* | 9/2013 | Geirhofer | H04W 24/10 370/252 |
| 2013/0242921 A1* | 9/2013 | Kim | H04L 5/0035 370/329 |
| 2013/0279628 A1* | 10/2013 | Mizuta | H04B 7/0456 375/296 |
| 2013/0293230 A1* | 11/2013 | Schneider | G01R 33/5612 324/309 |
| 2014/0037021 A1* | 2/2014 | Izumi | H04B 1/0475 375/295 |
| 2014/0037022 A1* | 2/2014 | Izumi | H04B 1/0483 375/295 |
| 2014/0140167 A1* | 5/2014 | Hunter | G01N 29/07 367/7 |
| 2014/0153668 A1* | 6/2014 | Xi | H04L 1/0668 375/295 |
| 2014/0177683 A1* | 6/2014 | Krishnamurthy | H04B 7/065 375/219 |
| 2014/0177744 A1* | 6/2014 | Krishnamurthy | H04B 7/0469 375/267 |
| 2014/0177745 A1* | 6/2014 | Krishnamurthy | H04B 7/0413 375/267 |
| 2014/0376652 A1* | 12/2014 | Sayana | H04B 7/0456 375/267 |
| 2015/0049824 A1* | 2/2015 | Kim | H04B 7/0617 375/267 |
| 2015/0098516 A1* | 4/2015 | Wang | H04B 7/0478 375/267 |
| 2015/0146618 A1* | 5/2015 | Ko | H04B 7/0456 370/328 |
| 2015/0244438 A1* | 8/2015 | Ding | H04L 1/00 375/267 |
| 2015/0249971 A1* | 9/2015 | Yu | H04W 72/04 370/330 |
| 2015/0280875 A1* | 10/2015 | Jing | H04B 7/0684 370/329 |
| 2015/0304010 A1* | 10/2015 | Zhang | H04L 25/0246 370/329 |
| 2015/0312074 A1* | 10/2015 | Zhu | H04W 52/16 370/329 |
| 2015/0372740 A1* | 12/2015 | Ko | H04B 7/0456 370/329 |
| 2015/0381247 A1* | 12/2015 | Ko | H04B 7/0632 370/329 |
| 2015/0382223 A1* | 12/2015 | Ko | H04B 7/0634 370/252 |
| 2016/0013847 A1* | 1/2016 | Kim | H04B 7/0417 375/267 |
| 2016/0013849 A1* | 1/2016 | Kakishima | H04B 7/0478 375/267 |
| 2016/0013890 A1* | 1/2016 | Xi | H04L 27/362 375/295 |
| 2016/0036511 A1* | 2/2016 | Ko | H04B 7/0456 370/252 |
| 2016/0043789 A1* | 2/2016 | Wang | H04B 7/0617 370/329 |
| 2016/0080053 A1* | 3/2016 | Sayana | H04B 7/0478 375/267 |
| 2016/0142117 A1* | 5/2016 | Rahman | H04B 7/0469 375/267 |
| 2016/0149617 A1* | 5/2016 | Zhu | H04L 5/005 375/267 |
| 2016/0218780 A1* | 7/2016 | Zhang | H04B 7/0486 |
| 2016/0270006 A1* | 9/2016 | Choi | H04W 52/365 |
| 2017/0099093 A1* | 4/2017 | Zhang | H04B 7/0456 |
| 2017/0099327 A1* | 4/2017 | Negaluli | H04L 1/0015 |
| 2017/0111098 A1* | 4/2017 | Kim | H04L 1/20 |
| 2017/0141940 A1* | 5/2017 | Izumi | H04L 25/0242 |
| 2017/0170883 A1 | 6/2017 | Zhang et al. | |
| 2017/0279514 A1* | 9/2017 | Rahman | H04L 5/0048 |
| 2018/0062728 A1* | 3/2018 | Kim | H04B 7/04 |
| 2018/0063826 A1* | 3/2018 | Kim | H04B 7/0695 |
| 2018/0097553 A1* | 4/2018 | Wang | H04L 25/03949 |
| 2018/0198499 A1* | 7/2018 | Park | H04B 7/06 |
| 2018/0212663 A1* | 7/2018 | Liu | H04W 24/10 |
| 2018/0219603 A1* | 8/2018 | Park | H04B 7/0478 |
| 2019/0013971 A1* | 1/2019 | Liu | H04L 5/0048 |
| 2019/0028158 A1* | 1/2019 | Park | H04B 7/0478 |
| 2019/0081670 A1* | 3/2019 | Liu | H04B 7/0469 |
| 2019/0081761 A1* | 3/2019 | Liu | H04J 13/0062 |
| 2019/0261336 A1* | 8/2019 | Liu | H04W 72/042 |
| 2020/0358497 A1* | 11/2020 | Liu | H04B 7/043 |

FOREIGN PATENT DOCUMENTS

| | | | |
|---|---|---|---|
| CN | 102340463 A | 2/2012 | |
| CN | 102546123 A | 7/2012 | |
| CN | 103201961 A | 7/2013 | |
| CN | 103401658 A | 11/2013 | |
| CN | 103475401 A | 12/2013 | |
| CN | 103621000 A | 3/2014 | |
| CN | 103684657 A | 3/2014 | |
| CN | 103746779 A | 4/2014 | |
| CN | 104025470 A | 9/2014 | |
| CN | 104184537 A | 12/2014 | |
| CN | 104412520 A | 3/2015 | |
| CN | 104488210 A | 4/2015 | |
| CN | 104956617 A | 9/2015 | |
| CN | 105323032 A | 2/2016 | |
| EP | 2863570 A1 | 4/2015 | |
| EP | 2863570 A1 * | 4/2015 | H04B 7/0639 |
| JP | 2014175810 A | 9/2014 | |
| WO | 2011054143 A1 | 5/2011 | |
| WO | 2013185320 A1 | 12/2013 | |
| WO | 2014052806 A1 | 4/2014 | |
| WO | 2014176813 A1 | 11/2014 | |
| WO | 2014198068 A1 | 12/2014 | |
| WO | 2015060562 A1 | 4/2015 | |
| WO | 2015147814 A1 | 10/2015 | |
| WO | 2015180178 A1 | 12/2015 | |
| WO | 2015183035 A1 | 12/2015 | |
| WO | 2016026350 A1 | 2/2016 | |
| WO | WO-2016134537 A1 * | 9/2016 | H04B 7/06 |
| WO | 2017157282 A1 | 9/2017 | |
| WO | 2017171361 A1 | 10/2017 | |
| WO | WO-2017181818 A1 * | 10/2017 | H04L 5/0048 |
| WO | WO-2020192790 A1 * | 10/2020 | H04L 25/0242 |

OTHER PUBLICATIONS

R1-103839, 3GPP TSG-RAN WG1 #61bis, Ericsson, ST-Ericsson:"Design and Evaluation of Precoder Codebooks for CSI Feedback", Dresden, Germany, Jun. 28-Jul. 2, 2010. 12 pages. XP50449505.

3GPP TSG RAN WG1 Meeting #80bis, R1-151364, CATT:"Evaluation of beamformed CSI-RS with subarray TXRU mapping", Belgrade, Serbia, Apr. 20-24, 2015. 12 pages.

Huawei et al.,"CSI feedback for beam space MIMO",3GPP TSG RAN WG1 Meeting #85 R1-164090, Nanjing, China, May 3-27, 2016, total 4 page (Year: 2018).

(56) References Cited

OTHER PUBLICATIONS

Samsung, "Linear combination codebook and CSI reporting", 3GPP TSG RAN WG1 Meeting #84bis R1-162693, Busan; orea, Apr. 11-15, 2016, total 7 pages (Year: 2018).

Huawei et al., "Discussion on analog CSI feedback", 3GPP TSG RAN WG1 Meeting #84bis R1-162595, Busan, Korea Apr. 11-15, 2016, total 8 pages (Year: 2018).

NTT Docomo et al: "Views on Beam Management Framework", 3GPP Draft; R1-1702798 Beam Management V2, Feb. 2017.

* cited by examiner

CHANNEL INFORMATION SENDING METHOD, DATA SENDING METHOD, AND DEVICE

CROSS-REFERENCE TO RELATED APPLICATIONS

This application is a continuation of U.S. patent application Ser. No. 16/188,911, filed on Nov. 13, 2018, which is a continuation of International Application No. PCT/CN2017/083978, filed on May 11, 2017. The International Application claims priority to Chinese Patent Application No. 201610319166.9, filed on May 13, 2016. All of the aforementioned patent applications are hereby incorporated by reference in their entireties as if reproduced in full.

TECHNICAL FIELD

The present invention relates to the field of wireless communications technologies, and in particular, to a channel information sending method, a data sending method, and a device.

BACKGROUND

Currently, in a Long Term Evolution (LTE) frequency division duplex (FDD) system, user equipment (UE) performs channel estimation based on a reference signal sent by a base station, then determines channel state information, and feeds back the channel state information. The channel state information includes a rank indicator (RI), a precoding matrix index (PMI), and a channel quality indicator (CQI).

The PMI is an index of a precoding matrix. The UE feeds back the PMI to the base station, and the base station determines the corresponding precoding matrix based on the received PMI, and performs precoding processing based on the determined precoding matrix, to improve downlink communication quality.

Currently, a manner of feeding back the PMI in the LTE FDD system is feeding back a precoding matrix W based on a dual-stage codebook structure:

$$W = W_1 \times W_2 \qquad \text{Formula 1}$$

where $$W_1 = \begin{bmatrix} b_0 & b_1 & \ldots & b_M & 0 & 0 & \ldots & 0 \\ 0 & 0 & \ldots & 0 & b_0 & b_1 & \ldots & b_{M-1} \end{bmatrix}.$$

Herein, $b_0, b_1, \ldots, b_{M-1}$ are vectors included in a code word $W_1$ corresponding to the precoding matrix W, and may be DFT vectors, where M is an integer not less than 2. A vector $b_i$ is a column vector whose length is a quantity of transmit antenna ports of the base station. A value of M may be a preset value or may be a value preconfigured by the base station.

When a channel matrix rank is equal to 1, there is:

$$W_2 = \begin{bmatrix} e_k \\ \phi_n e_k \end{bmatrix} \qquad \text{Formula 2}$$

When a channel matrix rank is equal to 2, there is:

$$W_2 = \begin{bmatrix} e_k & e_i \\ \varphi_n e_k & -\varphi_n e_i \end{bmatrix} \qquad \text{Formula 3}$$

Herein, $W_1$ indicates a set including M vectors, and $W_2$ includes column selection information and co-phase information.

Column selection information $e_k$ is an M×1 unit vector, only a value of a $k^{th}$ element is 1, and values of all other elements are 0. A case of $e_i$ is similar to that of $e_k$.

Co-phase information $\varphi_n$ is a phase difference between two polarization directions of transmit antennas of a second device 102, and a value is any number in a range from 0 to $2\pi$.

In the current dual-stage codebook structure, $W_2$ can only be used to select one vector from the M vectors: $b_0, b_1, \ldots,$ and $b_{M-1}$. Consequently, feedback of the precoding matrix W is not sufficiently precise.

SUMMARY

In view of this, a channel information sending method, a data sending method, and a device are provided, to improve feedback precision of channel information related to a precoding matrix, and further improve downlink adaptation performance.

According to a first aspect, an embodiment of the present invention provides a channel information sending method, including:

sending, by a second device, a reference signal to a first device, where the reference signal is sent on S antenna ports, the S antenna ports belong to H reference signal resource port groups, and H is an integer greater than or equal to 1; after receiving the reference signal, measuring, by the first device, the received reference signal, and obtaining and sending first channel information and second channel information to the second device; and generating, by the second device, a precoding matrix based on the received first channel information and the received second channel information, and sending data to the first device based on the generated precoding matrix.

The first channel information includes identification information of M first vectors, where M is an integer not less than 2. The second channel information includes information about a weighted combination factor used for performing weighted combination on N first vectors in the M first vectors, where N is a positive integer not greater than M. The weighted combination factor includes a first factor and/or a second factor. The first factor is an amplitude factor, and the second factor is a phase factor or a time delay factor.

A dimension of the first vector is a quantity of antenna ports in each reference signal resource port group, or a dimension of the first vector is half of a quantity of antenna ports in each reference signal resource port group.

The first device performs channel estimation based on the received reference signal, and feeds back, to the second device, the second channel information of the weighted combination factor used for performing weighted combination on the M first vectors. In this way, when generating the precoding matrix, the second device may perform weighted combination on the M first vectors based on the weighted combination factor indicated by the received second channel information, instead of selecting only one eigenvector from a plurality of eigenvectors, so that the generated precoding matrix is more precise, thereby improving a link adaptation capability of the second device for sending data, and improving system performance.

Optionally, the weighted combination factor includes an element 0, so that the N first vectors are selected.

Optionally, the first device further measures the reference signal to obtain third channel information, and sends the third channel information to the second device.

The third channel information is used to indicate a phase difference between two groups of antenna ports for the reference signal, and the second device generates the precoding matrix based on the first channel information, the second channel information, and the third channel information.

Optionally, the first device further measures the reference signal to obtain fourth channel information, and sends the fourth channel information to the second device.

The fourth channel information includes selection information used to select the N first vectors from the M first vectors.

The second device generates the precoding matrix based on the first channel information, the second channel information, and the fourth channel information. Optionally, the second device may generate the precoding matrix based on the third channel information. The second channel information includes only the information about the weighted combination factor used for performing weighted combination on the N first vectors indicated by the fourth channel information.

The first device feeds back the fourth channel information, so that the N first vectors can be selected, and accordingly an information feedback amount of the second channel information is reduced.

Optionally, the first device further measures the reference signal to obtain seventh channel information, and sends the seventh channel information to the second device. The seventh channel information includes identification information used to select Y reference signal resource port groups from the H reference signal resource port groups. The second device generates the precoding matrix based on the first channel information, the second channel information, and the seventh channel information. Optionally, the second device may generate the precoding matrix based on the third channel information and/or the fourth channel information.

Optionally, the seventh channel information is not fed back in a same subframe as other channel information.

Optionally, the first channel information includes a group number, in K vector groups, of each of X vector groups including the M first vectors, and all first vectors in the K vector groups constitute a universal set of the first vectors, where K is a positive integer, and X is a positive integer not greater than K.

Optionally, the M first vectors are obtained by performing measurement based on the Y reference signal resource port groups selected from the H reference signal resource port groups, where Y is a positive integer.

Optionally, the M first vectors correspond to the X vector groups, each vector group corresponds to one of the Y reference signal resource port groups, and X=Y. Alternatively, the M first vectors correspond to the X vector groups, at least two vector groups correspond to one of the Y reference signal resource port groups, and X>Y.

The M first vectors are grouped, so that a plurality of strong beam groups may be selected, the generated precoding matrix can better adapt to an actual channel condition, and link adaptation performance is improved.

Optionally, the first device sends, to the second device, information used to indicate a value of X. Alternatively, the first device receives, from the second device, information used to indicate a value of X.

Optionally, different vector groups in the K vector groups include or do not include a same first vector.

Different vector groups in the K vector groups include a same quantity of first vectors or different quantities of first vectors.

Optionally, different vector groups in the X vector groups correspond to the same second channel information, and for the different vector groups, the first device feeds back only one same piece of second channel information; or different vector groups correspond to different second channel information, and for the different vector groups, the first device separately feeds back the second channel information.

Optionally, each piece of channel information may be fed back in a flexible feedback manner, to improve channel information feedback precision, and reduce an information feedback amount as much as possible.

For example, a feedback manner of the first channel information is wideband based feedback, and a feedback manner of the second channel information is subband based feedback. Alternatively, both a feedback manner of the first channel information and a feedback manner of the second channel information are subband based feedback, and feedback bandwidth for the first channel information is greater than feedback bandwidth for the second channel information.

A feedback period of the first channel information is longer than a feedback period of the second channel information.

For another example, a feedback manner of the first channel information is wideband based feedback, and a feedback manner of the second channel information and a feedback manner of the third channel information are subband based feedback. Alternatively, a feedback manner of the first channel information, a feedback manner of the second channel information, and a feedback manner of the third channel information are all subband based feedback, and feedback bandwidth for the first channel information is greater than feedback bandwidth for the second channel information and feedback bandwidth for the third channel information.

A feedback period of the first channel information is longer than a feedback period of the second channel information and a feedback period of the third channel information.

For another example, a feedback manner of the first channel information and a feedback manner of the second channel information are wideband based feedback, and a feedback manner of the third channel information is subband based feedback. Alternatively, both feedback bandwidth for the first channel information and feedback bandwidth for the second channel information are greater than feedback bandwidth for the third channel information.

A feedback manner of the first channel information and a feedback manner of the second channel information are long-term feedback, and a feedback manner of the third channel information is short-term feedback.

Alternatively, both a feedback period of the first channel information and a feedback period of the second channel information are longer than a feedback period of the third channel information.

For another example, a feedback manner of the first channel information is wideband based feedback, and a feedback manner of the second channel information, a feedback manner of the third channel information, and a feedback manner of the fourth channel information are all subband based feedback. Alternatively, feedback bandwidth for the first channel information is greater than feedback bandwidth for the second channel information, feedback bandwidth for the third channel information, and feedback bandwidth for the fourth channel information.

A feedback period of the first channel information is longer than a feedback period of the second channel information, a feedback period of the third channel information, and a feedback period of the fourth channel information.

Optionally, both a feedback manner of the first channel information and a feedback manner of the second channel information are wideband based feedback, and both a feedback manner of the third channel information and a feedback manner of the fourth channel information are subband based feedback. Alternatively, feedback bandwidth for the first channel information and feedback bandwidth for the second channel information are greater than feedback bandwidth for the third channel information and feedback bandwidth for the fourth channel information.

A feedback period of the first channel information and a feedback period of the second channel information are longer than a feedback period of the third channel information and a feedback period of the fourth channel information.

Optionally, a feedback manner of the first channel information, a feedback manner of the second channel information, and a feedback manner of the fourth channel information are all wideband based feedback, and a feedback manner of the third channel information is subband based feedback. Alternatively, feedback bandwidth for the first channel information, feedback bandwidth for the second channel information, and feedback bandwidth for the fourth channel information are greater than feedback bandwidth for the third channel information.

A feedback period of the first channel information, a feedback period of the second channel information, and a feedback period of the fourth channel information are longer than a feedback period of the third channel information.

Optionally, both a feedback manner of the first channel information and a feedback manner of the fourth channel information are wideband based feedback, and both a feedback manner of the second channel information and a feedback manner of the third channel information are subband based feedback. Alternatively, feedback bandwidth for the first channel information and feedback bandwidth for the fourth channel information are greater than feedback bandwidth for the second channel information and feedback bandwidth for the third channel information.

A feedback period of the first channel information and a feedback period of the fourth channel information are longer than a feedback period of the second channel information and a feedback period of the third channel information.

Optionally, the first device measures the reference signal to obtain fifth channel information and sixth channel information, and the first device sends the fifth channel information and the sixth channel information to the second device.

The fifth channel information includes information used to indicate an amount of spatially multiplexed data from the second device to the first device, and the sixth channel information includes information used to indicate channel quality of a channel from the second device to the first device.

The second device further generates the precoding matrix based on the fifth channel information and the sixth channel information.

The first channel information and the fifth channel information are fed back in a first subframe by using a first period, and the second channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the fifth channel information is fed back in a first subframe by using a first period, the first channel information is fed back in a second subframe by using a second period, the second channel information is fed back in a third subframe by using a third period, and the sixth channel information is fed back in a fourth subframe by using a fourth period, where the first period is not less than the second period, the second period is not less than the third period, and the third period is not less than the fourth period.

Alternatively, when the third channel information is fed back, the first channel information and the fifth channel information are fed back in a first subframe by using a first period, the second channel information and the third channel information are fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, and the second channel information, the third channel information, and the sixth channel information are fed back in a second subframe by using a second period, where the first period is not less than the second period; or the first channel information, the second channel information, and the fifth channel information are fed back in a first subframe by using a first period, and the third channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the third channel information and the sixth channel information are fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, the third channel information is fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information is fed back in a second subframe by using a second period, the second channel information is fed back in a third subframe by using a third period, the third channel information is fed back in a fourth subframe by using a fourth period, and the sixth channel information is fed back in a fifth subframe by using a fifth period, where the first period is not less than the second period, the second period is not less than the third period, the third period is not less than the fourth period, and the fourth period is not less than the fifth period.

Alternatively, when the fourth channel information is fed back, the first channel information, the fourth channel information, and the fifth channel information are fed back in a first subframe by using a first period, the second channel information and the third channel information are fed back in a second subframe by using a second period, and the sixth channel information is fed back in a third subframe by using a third period, where the first period is not less than the second period, and the second period is not less than the third period; or the first channel information, the fourth channel information, and the fifth channel information are fed back in a first subframe by using a first period, and the second channel information, the third channel information, and the sixth channel information are fed back in a second subframe by using a second period, where the first period is not less than the second period; or the fifth channel information is fed back in a first subframe by using a first period, the first channel information and the fourth channel information are fed back in a second subframe by using a second period, the second channel information and the third channel information are fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information and the fourth channel information are fed back in a second subframe by using a second period, and the second channel information, the third channel information, and the sixth channel information are fed back in a third subframe by using a third period, where the first period is not less than the second period, and the second period is not less than the third period; or the fifth channel information, the first channel information, the second channel information, and the fourth channel information are fed back in a first subframe by using a first period, and the third channel information and the sixth channel information are fed back in a second subframe by using a second period, where the first period is not less than the second period; or the fifth channel information, the first channel information, and the fourth channel information are fed back in a first subframe by using a first period, the second channel information is fed back in a second subframe by using a second period, and the third channel information and the sixth channel information are fed back in a third subframe by using a third period, where the first period is not less than the second period, and the second period is not less than the third period; or the fifth channel information, the first channel information, and the fourth channel information are fed back in a first subframe by using a first period, the second channel information is fed back in a second subframe by using a second period, the third channel information is fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information and the fourth channel information are fed back in a second subframe by using a second period, the second channel information is fed back in a third subframe by using a third period, the third channel information is fed back in a fourth subframe by using a fourth period, and the sixth channel information is fed back in a fifth subframe by using a fifth period, where the first period is not less than the second period, the second period is not less than the third period, the third period is not less than the fourth period, and the fourth period is not less than the fifth period.

Optionally, the first channel information, the second channel information, and the third channel information constitute, in the following manner, the precoding matrix whose rank is 1:

$$W = \frac{1}{\|q\|}\begin{bmatrix} B_i & 0 \\ 0 & B_i \end{bmatrix}\begin{bmatrix} c_k \\ \varphi_n c_k \end{bmatrix}; \text{ where}$$

$$c_k = [\, c_{k,0} \;\; \ldots \;\; c_{k,m} \;\; \ldots \;\; c_{k,M-1} \,]^T,$$

$$B_i = [\, b_{i,0} \;\; \ldots \;\; b_{i,m} \;\; \ldots \;\; b_{i,M-1} \,]$$

$B_1$ is the M first vectors; $c_k$ is the weighted combination factor, where $c_{k,0}$ is used to perform weighting on $b_{i,0}$, $c_{k,m}$ is used to perform weighting on $b_{i,m}$, and $c_{k,M-1}$ is used to perform weighting on $b_{i,M-1}$; m is an integer, and $0 \le m \le M$; $\Phi_n$ is the phase difference that is between the two groups of antenna ports for the reference signal and that is indicated by the third channel information; and $\|q\|$ is a normalization factor.

Optionally, $B_i$ is a vector group whose group number is i in the K vector groups.

All the first vectors in the K vector groups constitute the universal set of the first vectors, and K is a positive integer.

The first channel information includes information used to indicate i.

Optionally, $B_i = [B_{i_0} \ldots B_{i_x} \ldots B_{i_{X-1}}]$, where the X vector groups $B_{i_0} \ldots B_{i_x} \ldots B_{i_{X-1}}$ are vector groups whose group numbers are sequentially $i_0$ to $i_{X-1}$ in the K vector groups, x is an integer, $0 \le x \le X-1$, and X is a positive integer.

All the first vectors in the K vector groups constitute the universal set of the first vectors, and K is a positive integer.

The first channel information includes information separately used to indicate $i_0$ to $i_{X-1}$.

Optionally, the first channel information, the second channel information, the third channel information, and the fourth channel information constitute, in the following manner, the precoding matrix whose rank is 1:

$$W = \frac{1}{\|q\|}\begin{bmatrix} B_i & 0 \\ 0 & B_i \end{bmatrix}\begin{bmatrix} e_{m_0} & \ldots & e_{m_{N-1}} & 0 & 0 & 0 \\ 0 & 0 & 0 & e_{m_0} & \ldots & e_{m_{N-1}} \end{bmatrix}\begin{bmatrix} c_k \\ \varphi_n c_k \end{bmatrix};$$

-continued where $$c_k = [\, c_{k,0} \ \ldots \ c_{k,m} \ \ldots \ c_{k,N-1} \,]^T,$$

and $B_i = [\, b_{i,0} \ b_{i,m} \ \ldots \ b_{i,M-1} \,]$;

$B_i$ is the M first vectors; $c_k$ is the weighted combination factor used for performing weighted combination on the N first vectors, where $c_{k,0}$ is used to perform weighting on $b_{i,m_0}$, $c_{k,m}$ is used to perform weighting on $b_{i,m_m}$, and $c_{k,N-1}$ is used to perform weighting on $b_{i,m_{N-1}}$; m is an integer, and $0 \le m \le M-1$; $\varphi_n$ is the phase difference that is between the two groups of antenna ports for the reference signal and that is indicated by the third channel information; a quantity of rows of $e_{m_0} \sim e_{m_{N-1}}$ is M, and the fourth channel information is information used to indicate $m_0$ to $m_{N-1}$, and $\|q\|$ is a normalization factor.

Optionally, the first device sends, to the second device, information used to indicate a value of N. Alternatively, the first device receives, from the second device, information used to indicate a value of N.

Optionally, the fourth channel information is used to indicate $$\begin{bmatrix} e_{m_0} & \ldots & e_{m_{N-1}} & 0 & 0 & 0 \\ 0 & 0 & 0 & e_{m_0} & \ldots & e_{m_{N-1}} \end{bmatrix}.$$

Alternatively, the fourth channel information includes M bits. In the M bits, an $m_0{}^{th}$ bit to an $m_{N-1}{}^{th}$ bit are 1, and remaining bits are 0.

Optionally, the first channel information, the second channel information, and the third channel information constitute, in the following manner, the precoding matrix whose rank is 2:

$$W = \frac{1}{\|q\|} \begin{bmatrix} B_i \cdot c_k & B_j \cdot c_y \\ \varphi_n B_i \cdot c_k & -\varphi_n B_j \cdot c_y \end{bmatrix}; \text{ where}$$

$$c_k = [\, c_{k,0} \ c_{k,m} \ \ldots \ c_{k,R-1} \,]^T, B_i = [\, b_{i,0} \ b_{i,m} \ \ldots \ b_{i,R-1} \,];$$

$$c_y = [\, c_{y,0} \ c_{y,n} \ \ldots \ c_{y,S-1} \,]^T, B_j = [\, b_{j,0} \ b_{j,n} \ \ldots \ b_{j,S-1} \,];$$

R and S are positive integers, $R \le M$, $S \le M$, and $B_i$ and $B_j$ jointly constitute the M first vectors; and $c_k$ and $c_y$ are weighted combination factors, where $c_{k,0}$ is used to perform weighting on $b_{i,0}$, $c_{k,m}$ is used to perform weighting on $b_{i,m}$, $c_{k,R-1}$ is used to perform weighting on $b_{i,R-1}$, $c_{y,0}$ is used to perform weighting on $b_{j,0}$, $c_{y,n}$ is used to perform weighting on $b_{j,n}$, and $c_{y,S-1}$ is used to perform weighting on $b_{j,S-1}$; m is an integer, and $0 \le m \le R-1$; n is an integer, and $0 \le n \le S-1$; $\varphi_n$ is the phase difference that is between the two groups of antenna ports for the reference signal and that is indicated by the third channel information; and $\|q\|$ is a normalization factor.

Optionally, $B_i$ is the same as $B_j$, and $c_k$ is different from $c_m$; or $B_i$ is different from $B_j$, and $c_k$ is the same as $c_m$; or
$B_i$ is different from $B_j$, and $c_k$ is different from $c_m$; or
$B_i$ is the same as $B_j$, and $c_k$ is the same as $c_m$.

Optionally, $B_i = [B_{i_0} \ldots B_{i_x} \ldots B_{i_{X-1}}]$.

The X vector groups $B_{i_0} \ldots B_{i_x} \ldots B_{i_{X-1}}$ are vector groups whose group numbers are sequentially $i_0$ to $i_{X-1}$ in the K vector groups, x is an integer, $0 \le x \le X-1$, and X is a positive integer.

All the first vectors in the K vector groups constitute the universal set of the first vectors, and K is a positive integer.

The first channel information includes information separately used to indicate $i_0$ to $i_{X-1}$.

$B_{i_0}$ corresponds to a first reference signal resource port group in the Y reference signal resource port groups in an H reference signal resource port group, $B_{i_x}$ corresponds to an $x^{th}$ reference signal resource port group in the Y reference signal resource port groups in the H reference signal resource port group, and $B_{i_x}$ corresponds to an $X^{th}$ reference signal resource port group in the Y reference signal resource port groups in the H reference signal resource port group.

Optionally, the second channel information is a time delay factor.

A form that is of the precoding matrix including the first channel information and the second channel information and that is in time domain is as follows:

$$W(\tau) = \sum_{m=0}^{N-1} b_{i,m} p_m \delta(\tau - \tau_m);$$

$\tau_m$ is the time delay factor corresponding to an $m^{th}$ vector in the N first vectors.

Optionally, $B_i$ is the M first vectors, and $B_i = [b_{i,0} \ b_{i,m} \ \ldots \ b_{i,M-1}]$.

Each first vector in $B_i$ is a Kronecker product of a second vector in a second vector group and a third vector in a third vector group: $b_{i,m} = a_{p,m_1} \otimes d_{t,m_2}$, where $b_{i,m}$ is the first vector, $a_{p,m_1}$ is the second vector whose number is $m_1$ in the second vector group whose number is p, and $d_{t,m_2}$ is the third vector whose number is $m_2$ in the third vector group whose number is t.

The first channel information includes first subchannel information and second subchannel information.

The first subchannel information is used to indicate p, and the second subchannel information is used to indicate t.

$$a_{p,m_1} = \left[\, 1 \ \ e^{j2\pi \frac{(p*S_1 + m_1)}{N_1 Q_1}} \ \ \ldots \ \ e^{j2\pi \frac{(N_1-1)(p*S_1 + m_1)}{N_1 Q_1}} \,\right]^T,$$

where $N_1$ is a quantity of first-dimension antenna ports in an antenna array, $Q_1$ is a factor used for oversampling DFT vectors that constitute a code word set of first-dimension antennas, and $s_1$ is a positive integer.

$$d_{t,m_2} = \left[\, 1 \ \ e^{j2\pi \frac{(p*S_2 + m_2)}{N_2 Q_2}} \ \ \ldots \ \ e^{j2\pi \frac{(N_1-1)(t*S_2 + m_2)}{N_2 Q_2}} \,\right]^T,$$

where $N_2$ is a quantity of second-dimension antenna ports in the antenna array, $Q_2$ is a factor used for oversampling DFT vectors that constitute a code word set of second-dimension antennas, and $S_2$ is a positive integer.

Optionally, a quantity of second vector groups is greater than or equal to 2, and a quantity of third vector groups is equal to 1; or a quantity of third vector groups is greater than or equal to 2, and a quantity of second vector groups is equal to 1; or a quantity of third vector groups is equal to 1, and a quantity of second vector groups is equal to 1.

Optionally, the second vector and the third vector are DFT vectors.

A quantity of vectors included in a universal set of second vectors and a quantity of vectors included in a universal set of third vectors are mutually independently configured.

Optionally, the second channel information includes third subchannel information, and the third subchannel information is used to indicate the first factor.

The third subchannel information is not quantized.

Alternatively, first quantization is performed on the third subchannel information, and a quantization order of the first quantization is not greater than a preset first-quantization order threshold.

Optionally, the second channel information includes fourth subchannel information, and the fourth subchannel information is used to indicate the second factor.

The fourth subchannel information is not quantized.

Alternatively, second quantization is performed on the fourth subchannel information, and a quantization order of the second quantization is not less than a preset second-quantization order threshold.

According to a second aspect, an embodiment of the present invention provides a first device, and the first device has a function of implementing behavior of the first device in the foregoing method. The function may be implemented by using hardware, or may be implemented by executing corresponding software by hardware. The hardware or the software includes one or more modules corresponding to the function.

In an optional implementation solution, a structure of the first device includes a processor, a transmitter, and a receiver. The processor is configured to support the first device in performing the corresponding function in the foregoing method. The transmitter is configured to support the first device in sending a message or data in the foregoing method to a second device. The receiver is configured to receive the message or the data in the foregoing method from the second device. The first device may further include a memory, and the memory is configured to couple to the processor, and stores a program instruction and data that are necessary for the first device.

According to a third aspect, an embodiment of the present invention provides a second device, and the second device has a function of implementing behavior of the second device in the foregoing method. The function may be implemented by using hardware, or may be implemented by executing corresponding software by hardware. The hardware or the software includes one or more modules corresponding to the function.

In an optional implementation solution, a structure of the second device includes a transmitter, a receiver, and a processor. The receiver is configured to support the second device in receiving a message or data in the foregoing method from a first device. The transmitter is configured to support the second device in sending the message or the data in the foregoing method to the first device. The processor is configured to support the second device in performing the corresponding function in the foregoing method. The second device may further include a memory, and the memory is configured to couple to the processor, and stores a program instruction and data that are necessary for the second device.

According to a fourth aspect, an embodiment of the present invention provides a wireless communications system, and the wireless communications system includes the first device and the second device according to any one of the first aspect to the third aspect.

According to a fifth aspect, an embodiment of the present invention provides a computer storage medium. The computer storage medium is configured to store a computer software instruction used by the first device according to any one of the first aspect to the fourth aspect, and includes a program designed for executing the foregoing aspects.

According to a sixth aspect, an embodiment of the present invention provides a computer storage medium. The computer storage medium is configured to store a computer software instruction used by the second device according to any one of the first aspect to the fourth aspect, and includes a program designed for executing the foregoing aspects.

According to a seventh aspect, an embodiment of the present invention provides a channel information sending method, including:

sending, by a second device, a reference signal to a first device; receiving, by the first device, the reference signal sent by the second device; after receiving the reference signal, measuring, by the first device, the received reference signal, to obtain first channel information and second channel information, and sending the first channel information and the second channel information to the second device; and generating, by the second device, a precoding matrix based on the received first channel information and the received second channel information, and sending data to the first device based on the generated precoding matrix.

The first channel information includes identification information of N antenna ports in M antenna ports for the reference signal, where M is an integer not less than 2, and N is a positive integer not greater than M. The second channel information includes information about a weighted combination factor used for performing weighted combination on the N antenna ports. The weighted combination factor includes a first factor and/or a second factor. The first factor is an amplitude factor, and the second factor is a phase factor or a time delay factor.

The first device performs channel estimation based on the received reference signal, and feeds back, to the second device, the second channel information of the weighted combination factor used for performing weighted combination on the M antenna ports for the reference signal. In this way, when generating the precoding matrix, the second device may perform weighted combination on the M antenna ports based on the weighted combination factor indicated by the received second channel information, so that a relatively precise precoding matrix can also be generated, thereby also improving a link adaptation capability of the second device for sending data, and improving system performance.

Optionally, the weighted combination factor includes an element 0, so that the N antenna ports are selected.

Optionally, the first device measures the reference signal to obtain third channel information, and sends the third channel information to the second device. The third channel information includes a phase difference between two groups of antenna ports obtained by grouping the M antenna ports. The second device generates the precoding matrix based on the first channel information, the second channel information, and the third channel information.

Optionally, each piece of channel information may be fed back in a flexible feedback manner, to improve channel information feedback precision, and reduce an information feedback amount as much as possible.

For example, a feedback manner of the first channel information is wideband based feedback, and a feedback manner of the second channel information is subband based feedback. Alternatively, both a feedback manner of the first channel information and a feedback manner of the second channel information are subband based feedback, and feedback bandwidth for the first channel information is greater than feedback bandwidth for the second channel information.

A feedback period of the first channel information is longer than a feedback period of the second channel information.

For another example, a feedback manner of the first channel information is wideband based feedback, and a feedback manner of the second channel information and a feedback manner of the third channel information are subband based feedback. Alternatively, a feedback manner of the first channel information, a feedback manner of the second channel information, and a feedback manner of the third channel information are all subband based feedback, and feedback bandwidth for the first channel information is greater than feedback bandwidth for the second channel information and feedback bandwidth for the third channel information.

A feedback period of the first channel information is longer than a feedback period of the second channel information and a feedback period of the third channel information.

For another example, a feedback manner of the first channel information and a feedback manner of the second channel information are wideband based feedback, and a feedback manner of the third channel information is subband based feedback. Alternatively, both feedback bandwidth for the first channel information and feedback bandwidth for the second channel information are greater than feedback bandwidth for the third channel information.

A feedback manner of the first channel information and a feedback manner of the second channel information are long-term feedback, and a feedback manner of the third channel information is short-term feedback. Alternatively, both a feedback period of the first channel information and a feedback period of the second channel information are longer than a feedback period of the third channel information.

Optionally, the first device measures the reference signal to obtain fifth channel information and sixth channel information, and the first device sends the fifth channel information and the sixth channel information to the second device.

The fifth channel information includes information used to indicate an amount of spatially multiplexed data from the second device to the first device, and the sixth channel information includes information used to indicate channel quality of a channel from the second device to the first device.

The second device further generates the precoding matrix based on the fifth channel information and the sixth channel information.

The first channel information and the fifth channel information are fed back in a first subframe by using a first period, and the second channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the fifth channel information is fed back in a first subframe by using a first period, the first channel information is fed back in a second subframe by using a second period, the second channel information is fed back in a third subframe by using a third period, and the sixth channel information is fed back in a fourth subframe by using a fourth period, where the first period is not less than the second period, the second period is not less than the third period, and the third period is not less than the fourth period.

Alternatively, when the third channel information is fed back, the first channel information and the fifth channel information are fed back in a first subframe by using a first period, the second channel information and the third channel information are fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, and the second channel information, the third channel information, and the sixth channel information are fed back in a second subframe by using a second period, where the first period is not less than the second period; or the first channel information, the second channel information, and the fifth channel information are fed back in a first subframe by using a first period, and the third channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the third channel information and the sixth channel information are fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, the third channel information is fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information is fed back in a second subframe by using a second period, the second channel information is fed back in a third subframe by using a third period, the third channel information is fed back in a fourth subframe by using a fourth period, and the sixth channel information is fed back in a fifth subframe by using a fifth period, where the first period is not less than the second period, the second period is not less than the third period, the third period is not less than the fourth period, and the fourth period is not less than the fifth period.

Optionally, the first channel information, the second channel information, and the third channel information constitute, in the following manner, the precoding matrix whose rank is 1:

$$W = \frac{1}{\|q\|} \begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix} \begin{bmatrix} c_k \\ \varphi_n c_k \end{bmatrix}; \text{where}$$

$$c_k = [c_{k,0} \ c_{k,m} \ \cdots \ c_{k,N-1}]^T,$$

$$B_i = [b_{i,0} \ b_{i,m} \ \cdots \ b_{i,M-1}]; \text{and}$$

$$\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}$$

corresponds to the first channel information; $c_k$ is a weighted combination factor used for performing weighted combination on the N/2 ports, where $c_{k,0}$ is used to perform weighting on an $m_0^{th}$ port and an $(m_0+N/2)^{th}$ port, $c_{k,m}$ is used to perform weighting on an $m_{N-1}^{th}$ port and an $(m_{N-1}+N/2)^{th}$ port, and $c_{k,N-1}$ is used to perform weighting on an $m_{N-1}^{th}$ port and an $(m_{N-1}+N/2)^{th}$ port; m is an integer, and $0 \le m \le M-1$; $\varphi_n$ is the phase difference that is between the two groups of antenna ports for the reference signal and that is indicated by the third channel information; a quantity of rows of $e_{m_0} \sim e_{m_{N-1}}$ is M; and $\|q\|$ is a normalization factor.

Optionally, the first device sends, to the second device, information used to indicate a value of N.

Alternatively, the first device receives, from the second device, information used to indicate a value of N.

Optionally,
the first channel information is used to indicate $$\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}.$$

Alternatively, the first channel information includes M bits. In the M bits, an $m_0^{th}$ bit to an $m_{N-1}^{th}$ bit are 1, and remaining bits are 0.

Optionally, the first channel information, the second channel information, and the third channel information constitute, in the following manner, the precoding matrix whose rank is 2:

$$W = \frac{1}{\|q\|} \begin{bmatrix} E_i \cdot c_k & E_j \cdot c_y \\ \varphi_n E_i \cdot c_k & -\varphi_n E_j \cdot c_y \end{bmatrix}; \text{where}$$

$$c_k = [c_{k,0} \ \cdots \ c_{k,m} \ \cdots \ c_{k,R-1}]^T,$$

$$E_i = [e_{i_0} \ \cdots \ e_{i_m} \ \cdots \ e_{i_{R-1}}];$$

$$c_y = [c_{y,0} \ \cdots \ c_{y,n} \ \cdots \ c_{y,S-1}]^T,$$

$$E_j = [e_{j_0} \ \cdots \ e_{j_n} \ \cdots \ e_{j_{S-1}}];$$

R and S are positive integers, $R \le M$, and $S \le M$; and $c_k$ and $c_y$ are weighted combination factors, where $c_{k,0}$ is used to perform weighting on an $i_0^{th}$ port and an $(i_0+N/2)^{th}$ port, $c_{k,m}$ is used to perform weighting on an $i_m^{th}$ port and an $(i_m+N/2)^{th}$ port, $c_{k,R-1}$ is used to perform weighting on an $i_{R-1}^{th}$ port and an $(i_{R-1}+N/2)^{th}$ port, $c_{y,0}$ is used to perform weighting on a $j_0^{th}$ port and a $(j_0+N/2)^{th}$ port, $c_{y,n}$ is used to perform weighting on a $j_n^{th}$ port and a $(j_n+N/2)^{th}$ port, and $c_{y,S-1}$ is used to perform weighting on a $j_{S-1}^{th}$ port and a $(j_{S-1}+N/2)^{th}$ port; m is an integer, and $0 \le m \le R-1$; n is an integer, and $0 \le n \le S-1$; $\varphi_n$ is the phase difference that is between the two groups of antenna ports for the reference signal and that is indicated by the third channel information; and $\|q\|$ is a normalization factor.

Optionally, $E_i$ is the same as $E_j$, and $c_k$ is different from $c_m$; or $E_i$ is different from $E_j$, and $c_k$ is the same as $c_m$; or
$E_i$ is different from $E_j$, and $c_k$ is different from $c_m$; or
$E_i$ is the same as $E_j$, and $c_k$ is the same as $c_m$.

Optionally, the second channel information is a time delay factor.

A form that is of the precoding matrix including the first channel information and the second channel information and that is in time domain is as follows:

$$W(\tau) = \sum_{m=0}^{N-1} e_{i_m} p_m \delta(\tau - \tau_m);$$

where $\tau_m$ is the time delay factor corresponding to an $m^{th}$ vector in the N first vectors.

Optionally, the second channel information includes first subchannel information, and the first subchannel information is used to indicate the first factor.

The first subchannel information is not quantized.

Alternatively, first quantization is performed on the first subchannel information, and a quantization order of the first quantization is not greater than a preset first-quantization order threshold.

Optionally, the second channel information includes second subchannel information, and the second subchannel information is used to indicate the second factor.

The second subchannel information is not quantized.

Alternatively, second quantization is performed on the second subchannel information, and a quantization order of the second quantization is not less than a preset second-quantization order threshold.

According to an eighth aspect, an embodiment of the present invention provides a first device, and the first device has a function of implementing behavior of the first device in the method provided in the seventh aspect. The function may be implemented by using hardware, or may be implemented by executing corresponding software by hardware. The hardware or the software includes one or more modules corresponding to the function.

In an optional implementation solution, a structure of the first device includes a processor, a transmitter, and a receiver. The processor is configured to support the first device in performing the corresponding function in the method provided in the seventh aspect. The transmitter is configured to support the first device in sending a message or data in the foregoing method to a second device. The receiver is configured to receive the message or the data in the foregoing method from the second device. The first device may further include a memory, and the memory is configured to couple to the processor, and stores a program instruction and data that are necessary for the first device.

According to a ninth aspect, an embodiment of the present invention provides a second device, and the second device has a function of implementing behavior of the second device in the method provided in the seventh aspect. The function may be implemented by using hardware, or may be implemented by executing corresponding software by hardware. The hardware or the software includes one or more modules corresponding to the function.

In an optional implementation solution, a structure of the second device includes a transmitter, a receiver, and a processor. The receiver is configured to support the second device in receiving a message or data in the foregoing method from a first device. The transmitter is configured to support the second device in sending the message or the data in the foregoing method to the first device. The processor is configured to support the first device in performing the corresponding function in the foregoing method. The second device may further include a memory, and the memory is configured to couple to the processor, and stores a program instruction and data that are necessary for the second device.

According to a tenth aspect, an embodiment of the present invention provides a wireless communications system, and the wireless communications system includes the first device and the second device according to any one of the seventh aspect to the ninth aspect.

According to an eleventh aspect, an embodiment of the present invention provides a computer storage medium. The computer storage medium is configured to store a computer software instruction used by the first device according to any one of the seventh aspect to the tenth aspect, and includes a program designed for executing the foregoing aspects.

According to a twelfth aspect, an embodiment of the present invention provides a computer storage medium. The computer storage medium is configured to store a computer software instruction used by the second device according to any one of the seventh aspect to the tenth aspect, and includes a program designed for executing the foregoing aspects.

DESCRIPTION OF EMBODIMENTS

Figure 1:
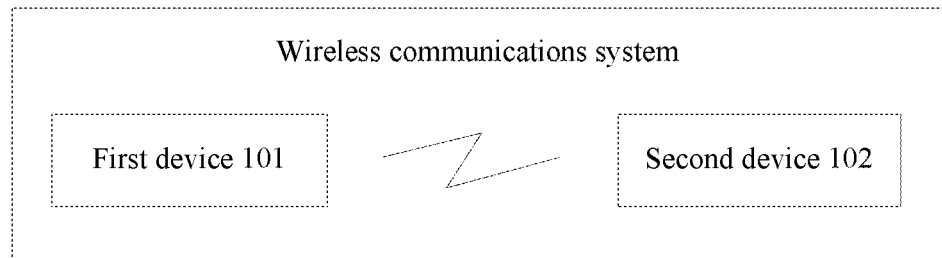
FIG. 1 is a schematic structural diagram of a wireless communications system according to an embodiment of the present invention.

To make the objectives, technical solutions, and advantages of this application more understandable, the following provides detailed descriptions. The detailed descriptions provide various implementations of an apparatus and/or a method by using block diagrams, flowcharts, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various hardware, software, and firmware, or any combination of hardware, software, and firmware.

In the embodiments of the present invention, a second device sends a reference signal to a first device. The first device performs channel estimation based on the received reference signal, generates channel information, and feeds back the channel information to the second device. The second device determines a precoding matrix based on the received channel information, and sends data to the first device based on the determined precoding matrix.

In the embodiments of the present invention, solutions can be categorized into Solution 1 and Solution 2, based on different channel information fed back by the first device and different manners of constituting the precoding matrix.

In Solution 1, reference signals sent by the second device are a reference signal on which beamforming is not performed and a reference signal on which beamforming is performed. The reference signal on which beamforming is not performed corresponds to H=1, and the reference signal on which beamforming is performed corresponds to H>1. For H>1, different reference signal resource port groups correspond to different beam directions, and antenna ports in one reference signal resource port group correspond to a same beam direction. For example, there are H=4 groups, and each group has eight antenna ports. A beam direction 1 is obtained by performing same beamforming on all eight antenna ports in a first reference signal resource port group, a beam direction 2 is obtained by performing same beamforming on all eight antenna ports in a second reference signal resource port group, and so on. The first device performs channel estimation based on the received reference signal, and feeds back, to the second device, second channel information of a weighted combination factor used for performing weighted combination on M first vectors. The M first vectors may be vectors included in a code word $W_1$ corresponding to the foregoing precoding matrix W. In this way, when generating the precoding matrix, the second device may perform weighted combination on the M first vectors based on the weighted combination factor indicated by the received second channel information, instead of selecting only one vector from a plurality of vectors, so that the generated precoding matrix is more precise, thereby improving a link adaptation capability of the second device for sending data, and improving system performance.

In Solution 2, if the reference signal sent by the second device is a reference signal on which beamforming is performed, the first device performs channel estimation based on the received reference signal, and feeds back, to the second device, second channel information of a weighted combination factor used for performing weighted combination on M antenna ports for the reference signal. In this way, when generating the precoding matrix, the second device may perform weighted combination on the M antenna ports based on the weighted combination factor indicated by the received second channel information, so that a relatively precise precoding matrix can also be generated, thereby also improving a link adaptation capability of the second device for sending data, and improving system performance.

The embodiments of the present invention are described below in detail with reference to the accompanying drawings.

First, composition of a wireless communications system to which both Solution 1 and Solution 2 are applicable is described.

FIG. 1 is a schematic structural diagram of a wireless communications system according to an embodiment of the present invention. As shown in FIG. 1, the wireless communications system includes a first device 101 and a second device 102.

The second device 102 sends a reference signal to the first device 101. The first device 101 performs channel estimation based on the reference signal received from the second device 102, and sends, to the second device 102, channel information used to indicate a channel estimation result. The second device 102 sends data to the first device 101 based on the received channel information.

Figure 2:
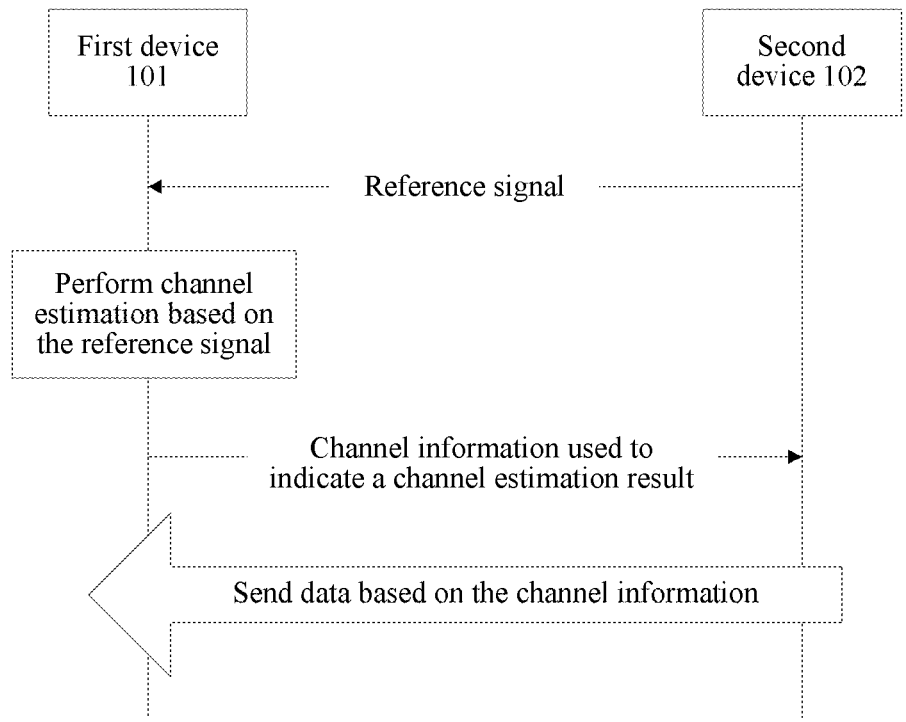
FIG. 2 is a diagram of interaction between a first device and a second device according to an embodiment of the present invention.

The foregoing process of interaction between the first device 101 and the second device 102 may be shown in FIG. 2.

The first device 101 may be a network device such as a base station, and the second device 102 may be a terminal device. Alternatively, the first device 101 may be a terminal device, and the second device 102 may be a network device. Alternatively, both the first device 101 and the second device 102 are terminal devices. Alternatively, both the first device 101 and the second device 102 are network devices.

Provided that the second device 102 sends a reference signal to the first device 101, and that the first device 101 performs channel estimation based on the reference signal and feeds back channel information, Solution 1 or Solution 2 provided in the embodiments of the present invention may be used to report the channel information and send data, to obtain a more precise channel estimation result and improve link adaptation performance.

In addition, regardless of a duplex manner used when the first device 101 and the second device 102 communicate with each other, such as the foregoing FDD duplex manner or a time division duplex (TDD) duplex manner, Solution 1 or Solution 2 provided in the embodiments of the present invention may be used, to obtain a precise channel estimation result and improve link adaptation performance.

A communications standard for communication between the first device 101 and the second device 102 may include but is not limited to Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution-Advanced (LTE-advanced), a personal handyphone system (PHS), Wireless Fidelity (WiFi) regulated by the 802.11 series of protocols, Worldwide Interoperability for Microwave Access (WiMAX), and various evolved wireless communications systems in the future.

The terminal device may be a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (for example, RAN). The wireless terminal may be a mobile terminal such as a mobile phone (also referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a subscriber unit, a subscriber station, a mobile station, a mobile, a remote station, an access point, a remote terminal, an access terminal), a user terminal, a user agent, a user device, or user equipment.

The network device may include a base station, or a radio resource management device for controlling a base station, or may include a base station and a radio resource management device for controlling the base station. The base station may be a macro base station or a micro base station, such as a small cell or a pico cell. Alternatively, the base station may be a home base station, such as a home NodeB (HNB) or a home evolved NodeB (HeNB). The base station may also include a relay node (relay) and the like.

For example, in an LTE system such as TDD LTE, FDD LTE, or LTE-A, the network device may be an evolved NodeB (eNodeB), and the terminal device may be UE. In a TD-SCDMA system or a WCDMA system, the network device may include a NodeB and/or a radio network controller (RNC), and the terminal device may be UE. In a GSM system, the network device may include a base transceiver station (BTS) and/or a base station controller (BSC), and the terminal device may be a mobile station (MS). In a WiFi system, the network device may include an access point (AP) and/or an access controller (AC), and the terminal device may be a station (STA).

Solution 1 and Solution 2 are separately described below with reference to the wireless communications system shown in FIG. 1.

Solution 1

In Solution 1, channel information sent by a first device 101 to a second device 102 is shown in the following Table 1.

TABLE 1

| Channel information in Solution 1 | | |
| --- | --- | --- |
| Channel information | Meaning | Description |
| First channel information | Identification information of M first vectors | |
| Second channel information | Weighted combination factor | Used for performing weighted combination on N first vectors in the M first vectors, and including a first factor and/or a second factor<br>First factor: amplitude factor<br>Second factor: phase factor or time delay factor |
| Third channel information | Phase difference between two groups of antenna ports for a reference signal | |
| Fourth channel information | Selection information used to select N first vectors from the M first vectors | |

I. First Vector and Channel Information

The M first vectors are M first vectors in a universal set of first vectors. A value of M may be preset, for example, may be predefined in a communications standard followed by both the first device 101 and the second device 102 when the first device 101 and the second device 102 communicate with each other, or may be notified by the first device 101 to the second device 102 before the first device 101 sends the first channel information to the second device 102, or may be notified by the second device 102 to the first device 101 before the second device 102 sends the reference signal.

Herein, the universal set of first vectors is denoted as $B=[b_0 \ b_1 \ \ldots \ b_{L-1}]$, where L is a positive integer, and is a quantity of first vectors included in the universal set of first vectors.

In the universal set of first vectors, each first vector may represent one direction of a beam sent by the second device 102 to the first device 101.

Figure 3:
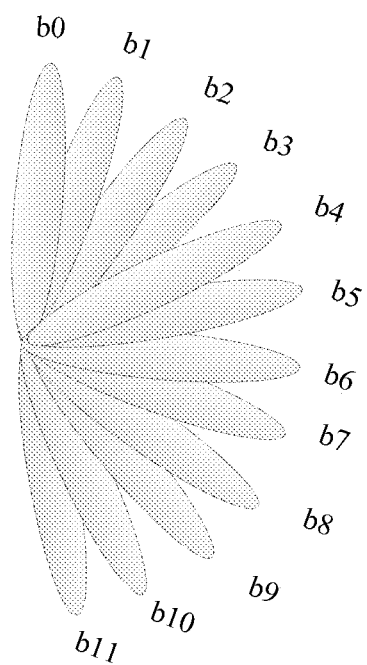
FIG. 3 is a schematic diagram of beam directions.

Referring to FIG. 3, it is assumed that L=12. In this case, $B=[b_0 \ b_1 \ \ldots \ b_{11}]$, and vectors $b_0 \ b_1 \ \ldots \ b_{11}$ respectively represent 12 beam directions in FIG. 3.

The first device 101 sends the first channel information to the second device 102 to notify the second device 102 of a beam direction from which the first device 101 expects to receive the reference signal, and sends the second channel information to the second device 102 to notify the second device 102 that a combined beam that the first device 101 expects to receive is a weighted combination adjustment amount of amplitude and phase weighting of each corresponding beam direction (each first vector) in the first channel information.

When determining the first channel information and the second channel information, the first device 101 may measure the reference signal to obtain a channel estimation result; determine a beam direction in which the second device 102 needs to send data when a maximum received signal to noise ratio (SNR) can be reached or a capacity is maximized, and a weighted combination adjustment amount of amplitude and phase weighting in each beam direction in which the second device 102 needs to send data; and then notify the second device 102 by using the first channel information and the second channel information.

It is still assumed that L=12, and $B=[b_0 \ b_1 \ \ldots \ b_{11}]$. If a dual stage codebook structure $W=W_1 \times W_2$ is used for a precoding matrix, M=4, and the first device 101 selects first four first vectors: $b_0$, $b_1$, $b_2$, and $b_3$, the precoding matrix W m be indicated as:

$$W = \frac{1}{\|q\|} \begin{bmatrix} b_0 & b_1 & b_2 & b_3 & 0 & 0 & 0 & 0 \\ 0 & 0 & 0 & 0 & b_0 & b_1 & b_2 & b_3 \end{bmatrix} \begin{bmatrix} c_k \\ \varphi_n c_k \end{bmatrix} ; \text{where} \quad \text{Formula 4}$$

$$W_1 = \begin{bmatrix} b_0 & b_1 & b_2 & b_3 & 0 & 0 & 0 & 0 \\ 0 & 0 & 0 & 0 & b_0 & b_1 & b_2 & b_3 \end{bmatrix}, \text{ and}$$

$$W_2 = \begin{bmatrix} c_k \\ \varphi_n c_k \end{bmatrix}.$$

The first channel information is used to identify $b_0$, $b_1$, $b_2$, and $b_3$.

The second channel information is $c_k = p_k * \alpha_k$, where $$p_k \in \{p_0, p_1, p_2, p_3\} = \left\{\frac{1}{4}, \frac{3}{4}, \frac{1}{8}, \frac{7}{8}\right\},$$

$$\alpha_k \in \{\alpha_0, \alpha_1, \alpha_2, \alpha_3\} \in \{1, -1, j, -j\},$$

Figure 4:
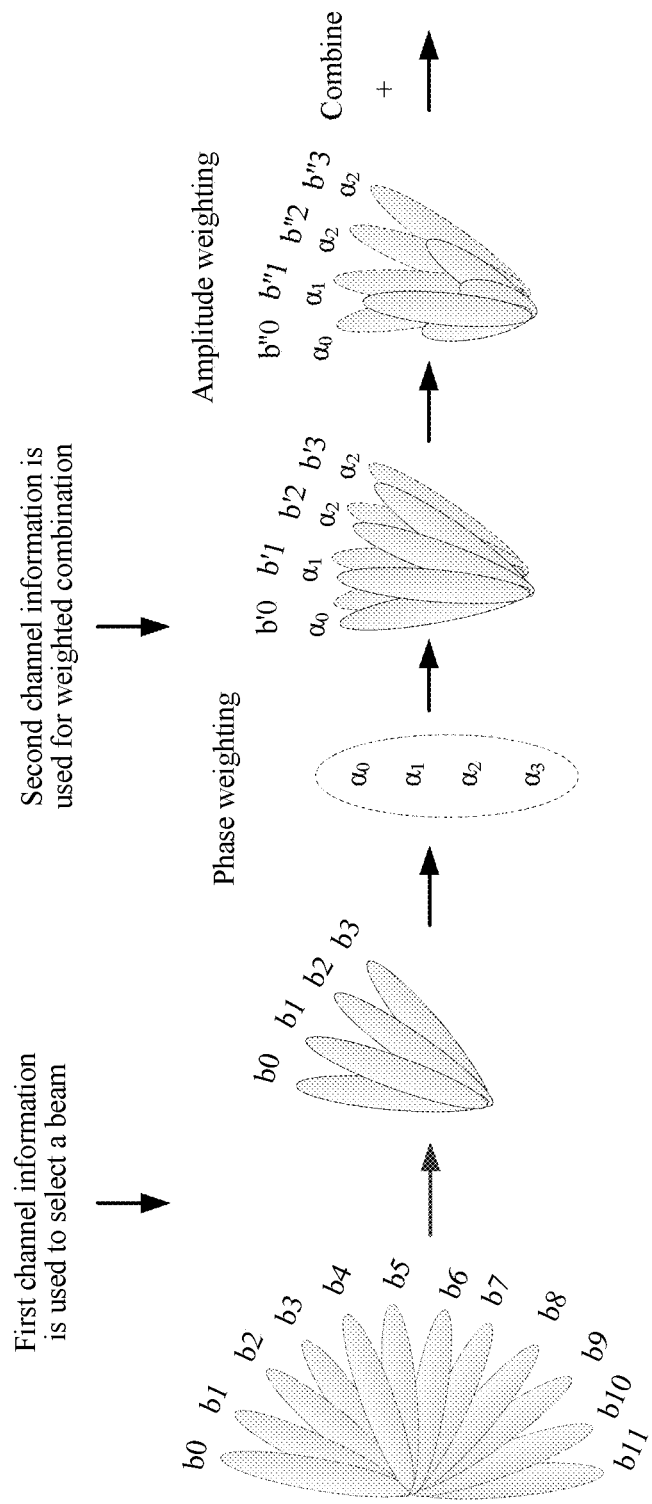
FIG. 4 to FIG. 8 are schematic diagrams of a beam selection and weighted combination process according to an embodiment of the present invention.
Figure 5:
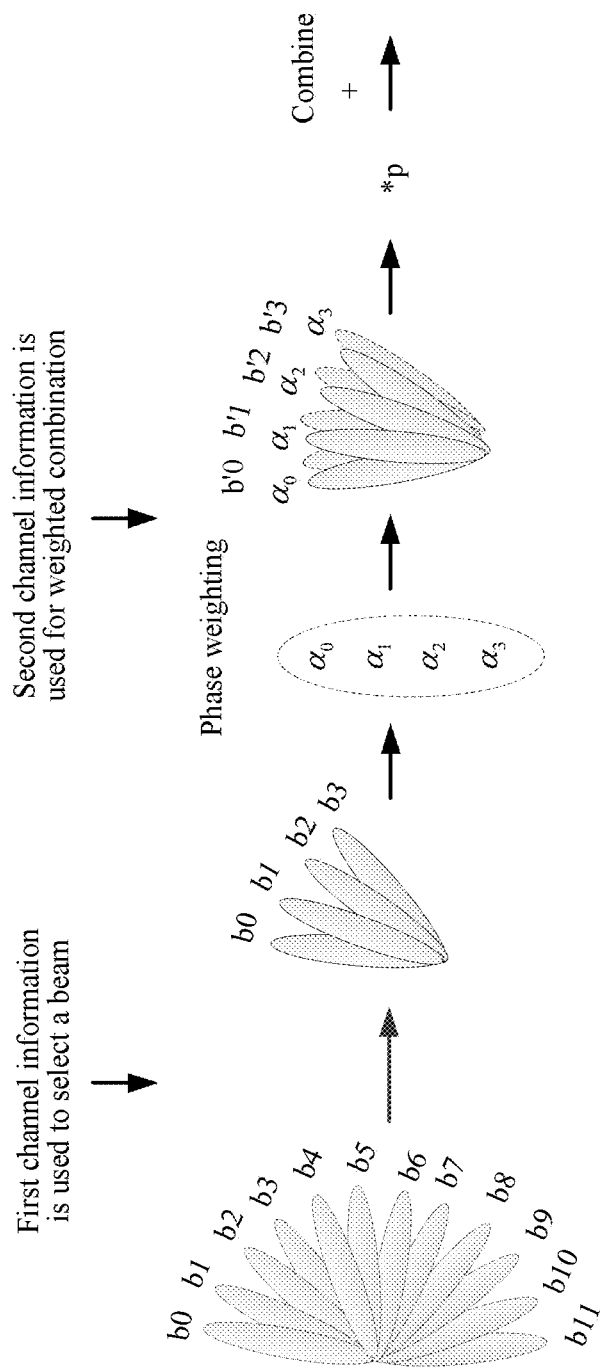

$p_k$ is an amplitude factor, $\alpha_k$ is a phase factor, $p_0$ is used to perform amplitude weighting on $b_0$, $\alpha_0$ is used to perform phase weighting on $b_0$, and so on. $\|q\|$ is a normalization factor. A value of the amplitude factor and a value of the phase factor herein are merely examples. An entire beam selection and weighted combination process may be shown in FIG. 4. Beams $b_0$, $b_1$, $b_2$, and $b_3$ are selected by using $W_1$, phase weighting is performed on the beams by using $\alpha_k$, to obtain vectors $b'_0$, $b'_1$, $b'_2$, and $b'_3$; after phase weighting. Beams $b''_0$, $b''_1$, $b''_2$, and $b''_3$; are obtained by performing amplitude weighting by using $p_k$, and then vectors $b''_0$, $b''_1$, $b''_2$, and $b''_3$ are combined to obtain one combined vector. The vector corresponds to one combined beam. In FIG. 4, phase weighting is performed before amplitude weighting, and FIG. 4 herein is merely schematic. Actually, amplitude weighting may be performed before phase weighting, or amplitude weighting and phase weighting may be simultaneously performed. Optionally, if phase weighting amounts for all vectors are the same, the first device 101 may feed back only one phase factor for a plurality of beams. Likewise, if amplitude weighting values for all vectors are the same, the first device 101 may feed back only one amplitude factor for a plurality of vectors, such as p shown in FIG. 5.

The first vectors may be vectors included in a code word $W_1$ corresponding to the foregoing precoding matrix W, and may be Discrete Fourier Transform (DFT) vectors, for example, in a form shown in the following formula 5:

$$DFT = [b_0 \ b_1 \ \ldots \ b_{L-1}] = \begin{bmatrix} 1 & 1 & \ldots & 1 \\ 1 & e^{j\frac{2\pi}{L}} & \ldots & e^{j\frac{2\pi}{L}(L-1)} \\ \vdots & \vdots & \ldots & \vdots \\ 1 & e^{j\frac{2\pi}{L}(I-1)} & \ldots & e^{j\frac{2\pi}{L}(I-1)(L-1)} \end{bmatrix} \quad \text{Formula 5}$$

L and I are positive integers, and L indicates a quantity of first vectors included in the universal set of first vectors, in other words, indicates a quantity of beams that are in different beam directions and that can be sent by the second device 102. I is a dimension of the first vector, is a quantity of antenna ports for the reference signal when a single-polarization manner is used for an antenna used by the second device 102 to send the reference signal, and is half of a quantity of antenna ports for the reference signal when a dual-polarization manner is used for an antenna used by the second device 102 to send the reference signal. The antenna port for the reference signal is an antenna port used by the second device 102 to send the reference signal.

For example, if L=32, and I=4, $$B=[b_0 b_1 \ldots b_{31}] \quad \text{Formula 6; where}$$

$$[B]_{1+i,1+l} = e^{j\frac{2\pi i l}{32}}, i = 0, 1, 2, 3, l = 0, 1, \ldots, 31.$$

The second channel information may include only the first factor, or include only the second factor, or include both the first factor and the second factor.

For example, if the second channel information includes only the first factor, when weighted combination is performed on the M first vectors, phase weighting may not be performed on the vectors, or phase weighting is performed on the M first vectors based on a preset same phase weighting amount, or phase weighting is performed based on preset different phase weighting amounts for different first vectors. Because the phase weighting amount is preset, the first device 101 does not need to feed back the phase weighting amount to the second device 102.

For another example, if the second channel information includes only the second factor, when weighted combination is performed on the M first vectors, weighting may be performed on the first vectors based on a preset same amplitude value, or weighting is separately performed on the first vectors based on preset different amplitude factors for different first vectors. Because the amplitude value is preset, the first device 101 does not need to feed back the amplitude value to the second device 102.

The phase factor and the time delay factor in the second factor are actually used to respectively perform phase weighting on the first vector from perspectives of frequency domain and time domain. A time delay in time domain is equivalent to phase weighting in frequency domain. Therefore, if the phase factor needs to be fed back, only either of the phase factor and the time delay factor needs to be fed back. Optionally, a feedback manner of the phase factor is subband based feedback, and a feedback manner of the time delay factor is wideband based feedback.

The third channel information is used to indicate the phase difference between the two groups of antenna ports for the reference signal. For example, the two groups of antenna ports have different polarization directions. In this case, the phase difference indicates a phase difference between the two groups of antenna ports having different polarization directions. For example, there are eight antenna ports in total, four antenna ports are horizontally polarized, and the other four antenna ports are vertically polarized. In this case, the third channel information is used to indicate a phase difference between the two groups of antenna ports that are respectively horizontally polarized and vertically polarized.

The M first vectors are some first vectors in the universal set of first vectors. In an optional implementation, the universal set of first vectors is divided into K vector groups, and K is a positive integer. The M first vectors belong to X vector groups, and the X vector groups are some or all of the K vector groups. K is a positive integer, and X is a positive integer not greater than K.

Different vector groups in the K vector groups include or do not include a same first vector.

For example, the universal set of first vectors is B=[$b_0$ $b_1$ ... $b_{31}$]. Vectors $b_0$ $b_1$ ... $b_{31}$ are all 32 first vectors.

A grouping manner in which different vector groups in the K vector groups do not include a same first vector may be as follows: $b_0$ $b_1$ ... $b_{31}$ are grouped into eight groups (K=8), and each group has four first vectors. For example, $b_0$, $b_1$, $b_2$, and $b_3$ forms a vector group, $b_4$, $b_5$, $b_6$, and $b_7$ forms a vector group, and so on.

A grouping manner in which different vector groups in the K vector groups include a same first vector may be as follows: $b_0$ $b_1$ ... $b_{31}$ are grouped into 16 groups (K=16), and each group has four first vectors. For example, $b_0$, $b_1$, $b_2$, and $b_3$ forms a vector group, $b_2$, $b_3$, $b_4$, and $b_5$ forms a vector group, and so on.

The following is also a grouping manner in which different vector groups in the K vector groups include a same first vector: The 32 first vectors are divided into 16 groups in total, a group number k is 0 to 15, and K=16.

$$X^{(k)} \in \{[b_{2k \bmod 32} b_{(2k+1) \bmod 32} b_{(2k+2) \bmod 32} b_{(2k+3) \bmod 32}]: k=0,1,\ldots,15\} \quad \text{Formula 7;}$$

where $$W_1^{(k)} = \begin{bmatrix} X^{(k)} & 0 \\ 0 & X^{(k)} \end{bmatrix}.$$

If the M first vectors include two vector groups $X^{(i)}$ and $X^{(j)}$, $$W_1 = \begin{bmatrix} X^{(i)} & X^{(j)} & 0 & 0 \\ 0 & 0 & X^{(i)} & X^{(j)} \end{bmatrix}.$$

In this case, $$W = \frac{1}{\|q\|} \begin{bmatrix} b_{i,0} & b_{i,1} & b_{i,2} & b_{i,3} & b_{j,0} & b_{j,1} & b_{j,2} & b_{j,3} & 0 & 0 & 0 & 0 & 0 & 0 & 0 & 0 \\ 0 & 0 & 0 & 0 & 0 & 0 & 0 & 0 & b_{i,0} & b_{i,1} & b_{i,2} & b_{i,3} & b_{j,0} & b_{j,1} & b_{j,2} & b_{j,3} \end{bmatrix} W_2; \quad \text{Formula 8}$$

where $b_{i,0}$, $b_{i,1}$, $b_{i,2}$, and $b_{i,3}$ are four vectors in a vector group i, $b_{j,0}$, $b_{j,1}$, $b_{j,2}$, and $b_{j,3}$ are four vectors in a vector group j, the eight vectors together constitute the M first vectors, M=8, and $\|q\|$ is a normalization factor, and is equal to a square root of a quadratic sum of modulus of all elements in W, so that a power sum of all beams is 1.

If the foregoing grouping manner is used, the first channel information includes a group number of each of X vector groups including the M first vectors in the K vector groups, for example, information used to indicate the foregoing vector group numbers i and j. In such a feedback manner, a quantity of information bits of the first channel information can be reduced.

It is assumed that the first device 101 selects the vector group i and the vector group j, $W_2$ is used to separately perform weighting, for example, including both amplitude weighting and phase weighting, on all first vectors in $W_1^{(i)}$ and $W_1^{(j)}$. In this case, an expression of $W_2$ may be:

$$W_2 = \begin{bmatrix} c_i \\ c_j \\ \varphi_n c_i \\ \varphi_n c_j \end{bmatrix}; \text{ where} \quad \text{Formula 9}$$

$c_i = [c_{i,0} \ c_{i,1} \ c_{i,2} \ c_{i,3}]^T$, and $c_j = [c_{j,0} \ c_{j,1} \ c_{j,2} \ c_{j,3}]^T$.

$c_{i,k} = p_{i,k} * \alpha_{i,k}$. For example, $$p_{i,k} \in \left\{\frac{1}{4}, \frac{3}{4}, \frac{1}{8}, \frac{7}{8}\right\},$$

and $\alpha_{i,k} \in \{1, -1, j, -j\}$, where $\alpha_{i,k}$ is a phase adjustment amount before the first vectors are combined, the given $\{1,-1,j,-j\}$ is merely an example, and the phase adjustment amount is not limited to the four values; $p_{i,k}$ is an amplitude adjustment amount before the first vectors are combined; and first vectors in a same vector group may have a same amplitude factor and a same weighting factor.

In an application scenario of grouping the first vectors, a plurality of beams may be divided into different beam clusters. In practice, the first device 101 may select, from the plurality of clusters, a beam cluster in which received signal strength or a power value of a received reference signal is relatively large. In this way, after the first device 101 feeds back the channel information, the second device 102 may separately send data on beams in the plurality of beam clusters, and the first device 101 may receive downlink data on a plurality of beams with better receiving quality, so that performance is better.

Figure 6:
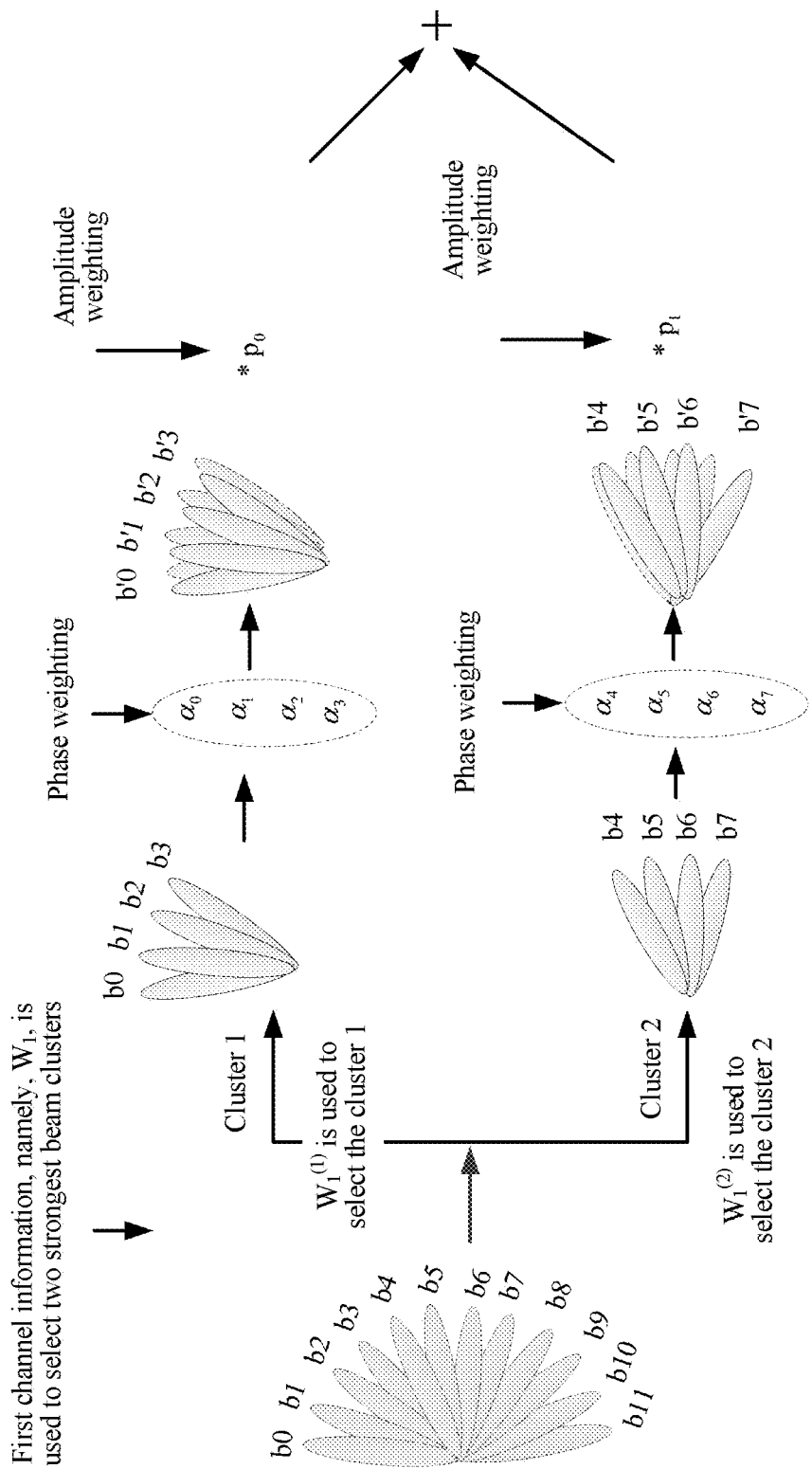

Referring to FIG. 6, first, two groups of first vectors are selected. A vector group 1 includes four first vectors: $b_0$, $b_1$, $b_2$, and $b_3$, and beams represented by the four vectors constitute a relatively strong beam cluster: cluster 1. A vector group 2 includes four first vectors: $b_4$, $b_5$, $b_6$, and $b_7$, and beams represented by the four vectors constitute a relatively strong beam cluster: cluster 2. $W_1^{(1)}$ is used to select the cluster 1, and $W_1^{(2)}$ is used to select the cluster 2. $\alpha_0$, $\alpha_1$, $\alpha_2$, $\alpha_3$ are respectively used to perform phase weighting on the beams represented by the first vectors $b_0$, $b_1$, $b_2$, and $b_3$. First vectors obtained after phase weighting are respectively $b'_0$, $b'_1$, $b'_2$, and $b'_3$. $\alpha_4$, $\alpha_5$, $\alpha_6$, $\alpha_7$, are respectively used to perform phase weighting on the beams represented by the first vectors $b_4$, $b_5$, $b_6$, and $b_7$. First vectors obtained after phase weighting are respectively $b'_4$, $b'_5$, $b'_6$, and $b'_7$. In FIG. 6, amplitude factors of all the vectors in the vector group 1 (namely, the cluster 1) are $p_0$, and amplitude factors of all the vectors in the vector group 2 (namely, the cluster 2) are $p_1$. Therefore, when sending the second channel information, the first device 101 may feed back only one amplitude factor $p_0$ for all the first vectors in the vector group 1, and feed back only one amplitude factor $p_1$ for all the first vectors in the vector group 2.

Optionally, the first device 101 may further send, to the second device 102, information used to indicate a value of X, to be specific, a quantity of vector groups to which the M first vectors belong. Alternatively, the first device 101 receives, from the second device 102, information used to indicate a value of X.

Figure 7:
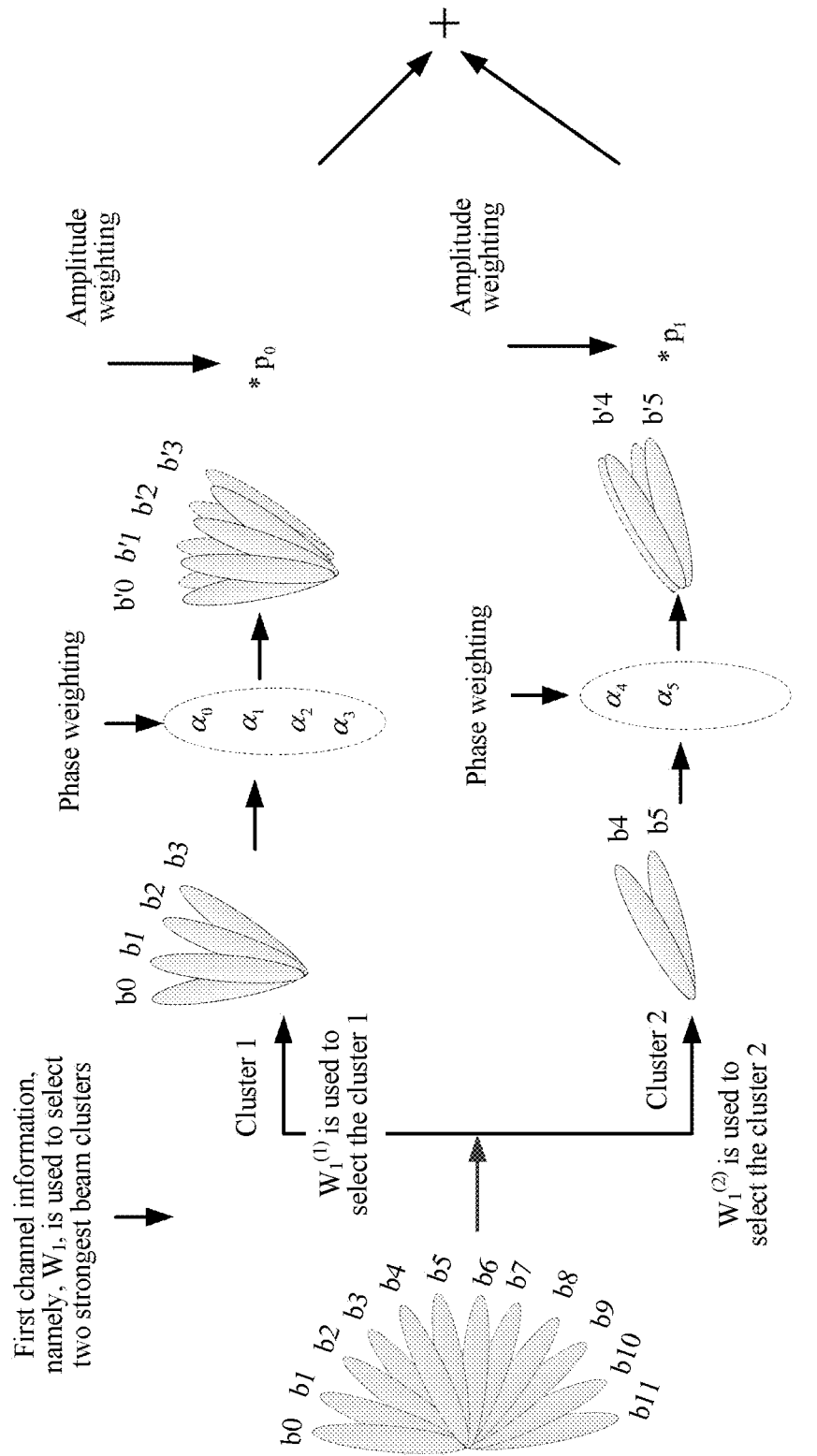

In the foregoing example, quantities of first vectors included in different vector groups are the same. However, in actual implementation, quantities of first vectors included in different vector groups may not be the same, as shown in FIG. 7.

In an optional implementation, different vector groups in the foregoing X vector groups correspond to same second channel information. For the different vector groups, the first device 101 sends only one same piece of second channel information to the second device 102. In this way, a bit quantity of the second channel information can be reduced.

In another optional implementation, different vector groups correspond to different second channel information. For the different vector groups, the first device 101 needs to separately feed back the second channel information.

Referring to Table 1, the second channel information is used to perform weighted combination on the N first vectors in the M first vectors. In this case, there are the following cases:

Case 1: If M=N, weighted combination is performed on all the M first vectors, and the second channel information needs to include a weighting factor of each of the M first vectors.

Case 2: If N<M, the N first vectors may be selected from the M first vectors in two manners:

The weighted combination factor indicated by the second channel information includes an element 0.

For example, an amplitude factor corresponding to a specific first vector in the M first vectors is 0. In this case, the first vector whose amplitude factor is 0 is removed from the M first vectors. In other words, the first vector corresponding to the amplitude factor is not selected.

The fourth channel information is sent to instruct to select the N first vectors from the M first vectors.

If the first device 101 sends the fourth channel information, when sending the second channel information, the first device 101 does not need to send a weighted combination factor of each of the M first vectors, but sends only a weighted combination factor of each of the N selected first vectors.

If the M first vectors include X vector groups, each of the X vector groups may have corresponding fourth channel information, so as to select a first vector from the vector group. A same quantity of first vectors or different quantities of first vectors may be selected from different vector groups.

Figure 8:
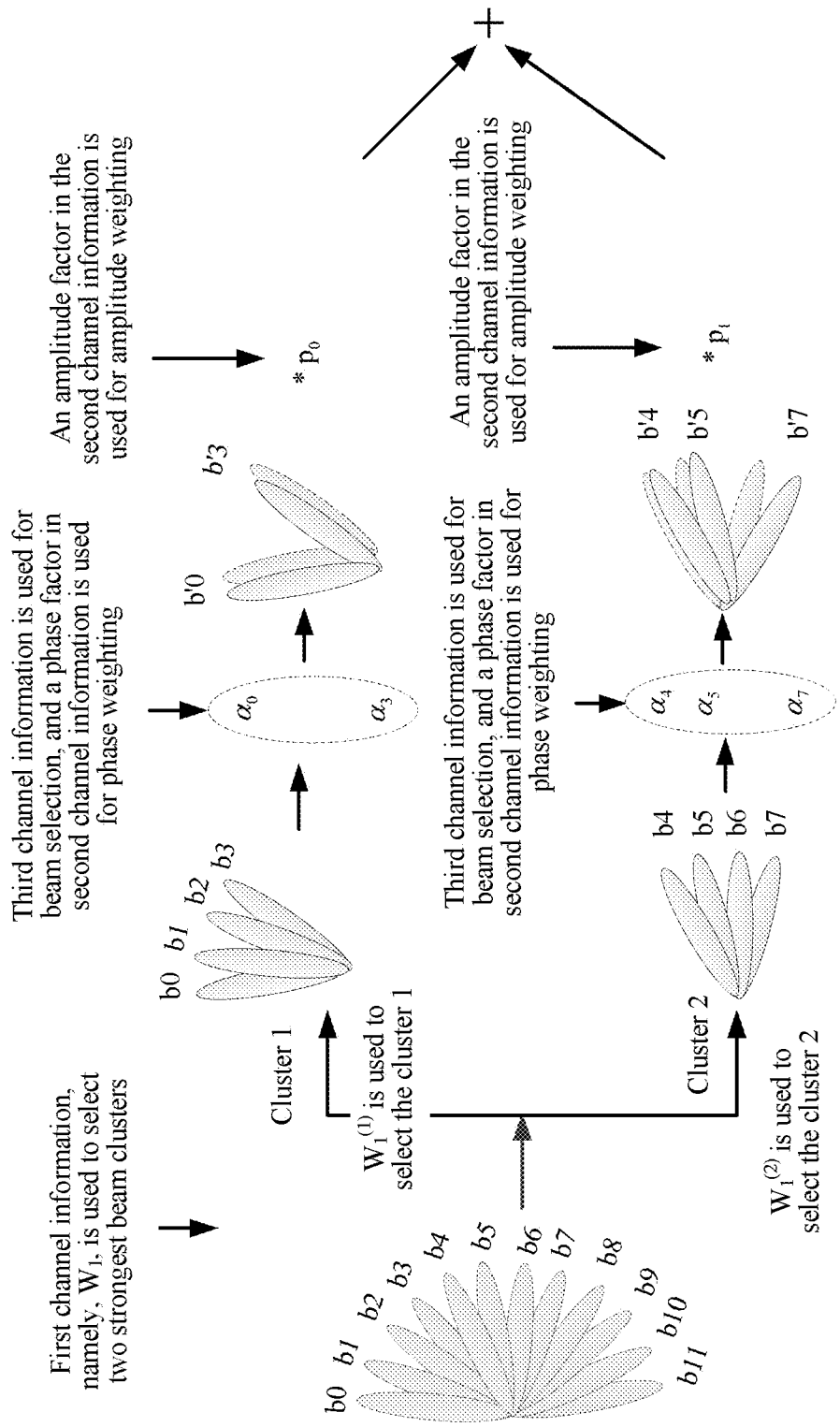

Referring to FIG. 8, column selection is performed inside each vector group. To be specific, weighted combination is performed after a first vector is selected. In addition, different quantities of columns may be selected from all vector groups. For example, for $W_1^{(1)}$, two first vectors are selected (in other words, two beams are selected). For $W_1^{(2)}$, three first vectors are selected (in other words, three beams are selected). Then, phase weighting and amplitude adjustment are separately performed on the two beams and the three beams.

The first vector and each piece of channel information are described above. How to construct a precoding matrix based on the channel information is described below.

II. Construction of a Precoding Matrix

1. The precoding matrix is constituted based on the first channel information, the second channel information, and the third channel information, and a rank is 1.

The precoding matrix W is:

$$W = \frac{1}{\|q\|} \begin{bmatrix} B_i & 0 \\ 0 & B_i \end{bmatrix} \begin{bmatrix} c_k \\ \varphi_n c_k \end{bmatrix}; \text{where}$$

$$c_k = [c_{k,0} \ \ldots \ c_{k,m} \ \ldots \ c_{k,M-1}]^T,$$

$$B_i = [b_{i,0} \ \ldots \ b_{i,m} \ \ldots \ b_{i,M-1}]$$

$B_i$ is the M first vectors; $c_k$ is the weighted combination factor, where $c_{k,0}$ is used to perform weighting on $b_{i,0}$, $c_{k,m}$ is used to perform weighting on $b_{i,m}$, and $c_{k,M-1}$ is used to perform weighting on $b_{i,M-1}$; m is an integer, and $0 \leq m \leq M$; $\varphi_n$ is the phase difference that is between the two groups of antenna ports for the reference signal and that is indicated by the third channel information; and J is a normalization factor.

If the M first vectors are grouped, $B_i$ is a vector group whose group number is i in the K vector groups. In this case, the first channel information includes information used to indicate i. If $B_i$ is indicated as $B_i=[B_{i_0} \ \ldots \ B_{i_x} \ \ldots \ B_{i_{X-1}}]$, where the X vector groups $B_{i_0} \ \ldots \ B_{i_x} \ \ldots \ B_{i_{X-1}}$ are vector groups whose group numbers are sequentially $i_0$ to $i_{X-1}$ in the K vector groups, x is an integer, $0 \leq x \leq X-1$, X is a positive integer, all first vectors in the K vector groups constitute a universal set of the first vectors, and K is a positive integer, the first channel information includes information used to separately indicate $i_0$ to $i_{X-1}$.

2. The precoding matrix is constituted based on the first channel information, the second channel information, the third channel information, and the fourth channel information, and a rank is 1.

The precoding matrix W is:

$$W = \frac{1}{\|q\|} \begin{bmatrix} B_i & 0 \\ 0 & B_i \end{bmatrix} \begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix} \begin{bmatrix} c_k \\ \varphi_n c_k \end{bmatrix}; \text{ where}$$

$$c_k = [c_{k,0} \ \cdots \ c_{k,m} \ \cdots \ c_{k,N-1}]^T, \text{ and}$$

$$B_i = [b_{i,0} \ \cdots \ b_{i,m} \ \cdots \ b_{i,M-1}];$$

and $B_i$ is the M first vectors; $c_k$ is the weighted combination factor used for performing weighted combination on the N first vectors, where $c_{k,0}$ is used to perform weighting on $b_{i,m_0}$, $c_{k,m}$ is used to perform weighting on $b_{i,m_m}$, ..., and $c_{k,N-1}$ is used to perform weighting on $b_{i,m_{N-1}}$; m is an integer, and $0 \le m \le M-1$; $\varphi_n$ is the phase difference that is between the two groups of antenna ports for the reference signal and that is indicated by the third channel information; a quantity of rows of $e_{m_0} \sim e_{m_{N-1}}$ is M, and the fourth channel information is information used to indicate $m_0$ to $m_{N-1}$; and $\|q\|$ is a normalization factor.

Optionally, the first device 101 sends, to the second device 102, information used to indicate a value of N.

Alternatively, the first device 101 receives, from the second device 102, information used to indicate a value of N.

Optionally, the fourth channel information may be used to indicate $$\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}.$$

Alternatively, the fourth channel information includes M bits. In the M bits, an $m_0^{th}$ bit to an $m_{N-1}^{th}$ bit are 1, and remaining bits are 0.

3. The precoding matrix is constituted based on the first channel information, the second channel information, and the third channel information, and a rank is 2.

The precoding matrix W is:

$$W = \frac{1}{\|q\|} \begin{bmatrix} B_i \cdot c_k & B_j \cdot c_y \\ \varphi_n B_i \cdot c_k & -\varphi_n B_j \cdot c_y \end{bmatrix}; \text{ where}$$

$$c_k = [c_{k,0} \ \cdots \ c_{k,m} \ \cdots \ c_{k,R-1}]^T,$$

$$B_i = [b_{i,0} \ \cdots \ b_{i,m} \ \cdots \ b_{i,R-1}];$$

$$c_y = [c_{y,0} \ \cdots \ c_{y,n} \ \cdots \ c_{y,S-1}]^T,$$

$$B_j = [b_{j,0} \ \cdots \ b_{j,n} \ \cdots \ b_{j,S-1}];$$

R and S are positive integers, $R \le M$, $S \le M$, and $B_i$ and $B_j$ jointly constitute the M first vectors; and $c_k$ and $c_y$ are weighted combination factors, where $c_{k,0}$ is used to perform weighting on $b_{i,0}$, $c_{k,m}$ is used to perform weighting on $b_{i,m}$, $c_{k,R-1}$ is used to perform weighting on $b_{i,R-1}$, $c_{y,0}$ is used to perform weighting on $b_{j,0}$, $c_{y,n}$ is used to perform weighting on $b_{j,n}$, and $c_{y,S-1}$ is used to perform weighting on $b_{j,S-1}$; m is an integer, and $0 \le m \le R-1$; n is an integer, and $0 \le n \le S-1$; $\varphi_n$ is the phase difference that is between the two groups of antenna ports for the reference signal and that is indicated by the third channel information; and $\|q\|$ is a normalization factor.

$B_i$ is the same as $B_j$, and $c_k$ is different from $c_m$; or
$B_i$ is different from $B_j$, and $c_k$ is the same as $c_m$; or
$B_i$ is different from $B_j$, and $c_k$ is different from $c_m$; or
$B_i$ is the same as $B_j$, and $c_k$ is the same as $c_m$.

4. If the second channel information is a time delay factor, a form that is of the precoding matrix including the first channel information and the second channel information and that is in time domain is as follows:

$$W(\tau) = \sum_{m=0}^{N-1} b_{i,m} p_m \delta(\tau - \tau_m);$$

where $\tau_m$ is the time delay factor corresponding to an $m^{th}$ vector in the N first vectors.

III. Two-Dimension Codebook

The foregoing description in Solution 1 may be used when transmit antennas of the second device 102 are a linear array, and a codebook of the precoding matrix is a one-dimension (D) codebook. Solution 1 may also be used when transmit antennas of the second device 102 include an antenna array with a horizontal direction and a vertical direction. In this case, a codebook of the precoding matrix is a 2D codebook. In a case of the 2D codebook, the precoding matrix may be still indicated as $W = W_1 W_2$.

However, different from the 1D codebook, each first vector in $W_1$ is a Kronecker product of vectors in two dimensions. The vectors in two dimensions are respectively referred to as a "second vector" and a "third vector".

$B_i$ is the M first vectors, and $B_i = [b_{i,0} \ b_{i,m} \ \ldots \ b_{i,M-1}]$.

Each first vector in $B_i$ is a Kronecker product of a second vector in a second vector group and a third vector in a third vector group: $b_{i,m} = a_{p,m_1} \otimes d_{t,m_2}$, where $b_{i,m}$ is the first vector, $a_{p,m_1}$ is a second vector whose number is $m_1$ in the second vector group whose number is p, and $d_{t,m_2}$ is a third vector whose number is $m_2$ in the third vector group whose number is t.

The first channel information includes first subchannel information and second subchannel information.

The first subchannel information is used to indicate p, and the second subchannel information is used to indicate t.

$$a_{p,m_1} = \left[ 1 \ e^{j2\pi \frac{(p*S_1 + m_1)}{N_1 Q_1}} \ \cdots \ e^{j2\pi \frac{(N_1-1)(p*S_1 + m_1)}{N_1 Q_1}} \right]^T;$$

where $N_1$ is a quantity of first-dimension antenna ports (for example, the foregoing horizontal antennas) in an antenna array, $Q_1$ is a factor used for oversampling DFT vectors that constitute a code word set of first-dimension antennas, and $s_1$ is a positive integer.

$$d_{t,m_2} = \left[ 1 \ e^{j2\pi \frac{(t*S_2 + m_2)}{N_2 Q_2}} \ \cdots \ e^{j2\pi \frac{(N_1-1)(p*S_2 + m_2)}{N_2 Q_2}} \right]^T;$$

where $N_2$ is a quantity of second-dimension antenna ports in the antenna array, $Q_2$ is a factor used for oversampling DFT vectors that constitute a code word set of second-dimension antennas, and $s_2$ is a positive integer.

Optionally, a quantity of second vector groups is greater than or equal to 2, and a quantity of third vector groups is equal to 1; or a quantity of third vector groups is greater than or equal to 2, and a quantity of second vector groups is equal to 1; or a quantity of third vector groups is equal to 1, and a quantity of second vector groups is equal to 1.

Optionally, the second vector and the third vector are DFT vectors.

A quantity of vectors included in a universal set of second vectors and a quantity of vectors included in a universal set of third vectors are mutually independently configured.

IV. Cases of Grouping the Antenna Ports for the Reference Signal

The foregoing description in Solution 1 is applicable to a case in which the antenna ports for the reference signal are not grouped. In another possible case, the reference signal is on S antenna ports, and the S antenna ports belong to H reference signal resource port groups, where H is an integer greater than or equal to 1. The reference signal is a reference signal on which beamforming is performed.

A dimension of the first vector is a quantity of antenna ports in each reference signal resource port group when a single-polarization manner is used for an antenna used by the second device 102 to send the reference signal. A dimension of the first vector is half of a quantity of antenna ports in each reference signal resource port group when a dual-polarization manner is used for an antenna used by the second device 102 to send the reference signal.

It can be learned that when H=1, in other words, the antenna ports for the reference signal are not grouped, that is, the case in Solution 1, Solution 1 is applicable to a case in which a reference signal on which beamforming is not performed.

For example, a quantity of antenna ports for the reference signal is 32, H=1, there is only one reference signal resource port group, and a quantity of ports in the reference signal resource port group is 32. In this case, a dimension of the first vector is 32 or 16.

For another example, a quantity of antenna ports for the reference signal is 32, and H=4. In this case, the 32 antenna ports are grouped into four reference signal resource port groups, and a quantity of antenna ports in each reference signal resource port group is 8. For example, antenna ports in a first reference signal resource port group are a port 0 to a port 7, antenna ports in a second reference signal resource port group are a port 8 to a port 15, antenna ports in a third reference signal resource port group are a port 16 to a port 23, and antenna ports in a fourth reference signal resource port group are a port 24 to a port 31. In this case, a dimension of the first vector is 8 (single polarization) or 4 (dual polarization).

Optionally, the first device 101 further measures the reference signal to obtain seventh channel information, and sends the seventh channel information to the second device.

The seventh channel information includes identification information used to select Y reference signal resource port groups from the H reference signal resource port groups.

The seventh channel information is not fed back in a same subframe as other channel information, in other words, is independently fed back. In addition, a feedback period of the seventh channel information is greater than or equal to a feedback period of the other channel information.

The M first vectors may be obtained by performing measurement based on the Y reference signal resource port groups selected from the H reference signal resource port groups, where Y is a positive integer.

Optionally, the M first vectors correspond to X vector groups, each vector group corresponds to one of the Y reference signal resource port groups, and X=Y.

Alternatively, the M first vectors correspond to X vector groups, at least two vector groups correspond to one of the Y reference signal resource port groups, and X>Y.

When the first device 101 feeds back the seventh channel information to the second device 102, it is assumed that $B_i = [B_{i_0} \ldots B_{i_x} \ldots B_{i_{X-1}}]$.

The X vector groups $B_{i_0} \ldots B_{i_x} \ldots B_{i_{X-1}}$ are vector groups whose group numbers are sequentially $i_0$ to $i_{X-1}$ in the K vector groups, x is an integer, $0 \le x \le X-1$, and X is a positive integer.

All the first vectors in the K vector groups constitute the universal set of the first vectors, and K is a positive integer.

The first channel information includes information separately used to indicate $i_0$ to $i_{X-1}$.

$B_{i_0}$ is obtained by the first device 101 by measuring a reference signal sent on a first reference signal resource port group in the Y reference signal resource port groups in an H reference signal resource port group. $B_{i_x}$ is obtained by the first device 101 by measuring a reference signal sent on an $x^{th}$ reference signal resource port group in the Y reference signal resource port groups in the H reference signal resource port group. $B_{i_x}$ is obtained by the first device 101 by measuring a reference signal sent on an $X^{th}$ reference signal resource port group in the Y reference signal resource port groups in the H reference signal resource port group.

Solution 2

In Solution 2, channel information sent by a first device 101 to a second device 102 is shown in the following Table 2.

TABLE 2

| Channel information in Solution 2 |||
| --- | --- | --- |
| Channel information | Meaning | Description |
| First channel information | Identification information of N antenna ports in M antenna ports for a reference signal | |
| Second channel information | Weighted combination factor | Used for performing weighted combination on the N antenna ports, and including a first factor and/or a second factor<br>First factor: amplitude factor<br>Second factor: phase factor or time delay factor |
| Third channel information | Phase difference between two groups of antenna ports obtained by grouping the M antenna ports | |

Optionally, the weighted combination factor indicated by the second channel information includes an element 0.

In Solution 2, a manner of constructing a precoding matrix is as follows.

1. A precoding matrix whose rank is 1 is constituted based on the first channel information, the second channel information, and the third channel information in the following manner:

$$W = \frac{1}{\|q\|}\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}\begin{bmatrix} c_k \\ \varphi_n c_k \end{bmatrix}; \text{where}$$

$$c_k = [c_{k,0} \ \cdots \ c_{k,m} \ \cdots \ c_{k,N-1}]^T, \text{ and}$$

$$B_i = [b_{i,0} \ \cdots \ b_{i,m} \ \cdots \ b_{i,M-1}]; \text{ and}$$

$$\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}$$

corresponds to the first channel information; $c_k$ is a weighted combination factor used for performing weighted combination on N/2 ports, where $c_{k,0}$ is used to perform weighting on an $m_0^{th}$ port and an $(m_0+N/2)^{th}$ port, $c_{k,m}$ is used to perform weighting on an $m_m^{th}$ port and an $(m_m+N/2)^{th}$ port, and $c_{k,N-1}$ is used to perform weighting on an $m_{N-1}^{th}$ port and an $(m_{N-1}+N/2)^{th}$ port; m is an integer, and $0 \le m \le M-1$; $\varphi_n$ is the phase difference that is between the two groups of antenna ports for the reference signal and that is indicated by the third channel information; a quantity of rows of $e_{m_0} \sim e_{m_{N-1}}$ is M; and $\|q\|$ is a normalization factor.

Optionally, the first device 101 sends, to the second device 102, information used to indicate a value of N, or the first device 101 receives, from the second device 102, information used to indicate a value of N.

Optionally, the first channel information is used to indicate $$\begin{bmatrix} e_{m_0} & \cdots & e_{m_{N-1}} & 0 & 0 & 0 \\ 0 & 0 & 0 & e_{m_0} & \cdots & e_{m_{N-1}} \end{bmatrix}.$$

Alternatively, the first channel information includes M bits. In the M bits, an $m_0^{th}$ bit to an $m_{N-1}^{th}$ bit are 1, and remaining bits are 0.

2. A precoding matrix whose rank is 2 is constituted based on the first channel information, the second channel information, and the third channel information in the following manner:

$$W = \frac{1}{\|q\|}\begin{bmatrix} E_i \cdot c_k & E_j \cdot c_y \\ \varphi_n E_i \cdot c_k & -\varphi_n E_j \cdot c_y \end{bmatrix}; \text{where}$$

$$c_k = [c_{k,0} \ \cdots \ c_{k,m} \ \cdots \ c_{k,R-1}]^T,$$

$$E_i = [e_{i_0} \ \cdots \ e_{i_m} \ \cdots \ e_{i_{R-1}}];$$

$$c_y = [c_{y,0} \ \cdots \ c_{y,n} \ \cdots \ c_{y,S-1}]^T,$$

$$E_j = [e_{j_0} \ \cdots \ e_{j_n} \ \cdots \ e_{j_{S-1}}];$$

R and S are positive integers, $R \le M$, and $S \le M$; and $c_k$ and $c_y$ are weighted combination factors, where $c_{k,0}$ is used to perform weighting on an $i_0^{th}$ port and an $(i_0+N/2)^{th}$ port, $c_{k,m}$ is used to perform weighting on an $i_m^{th}$ port and an $(i_m+N/2)^{th}$ port, $c_{k,R-1}$ is used to perform weighting on an $i_{R-1}^{th}$ port and an $(i_{R-1}+N/2)^{th}$ port, $c_{y,0}$ is used to perform weighting on a $j_0^{th}$ port and a $(j_0+N/2)^{th}$ port, $c_{y,n}$ is used to perform weighting on a $j_n^{th}$ port and a $(j_n+N/2)^{th}$ port, and $c_{y,S-1}$ is used to perform weighting on a $j_{S-1}^{th}$ port and a $(j_{S-1}+N/2)^{th}$ port; m is an integer, and $0 \le m \le R-1$; n is an integer, and $0 \le n \le S-1$; $\varphi_n$ is the phase difference that is between the two groups of antenna ports for the reference signal and that is indicated by the third channel information; and $\|q\|$ is a normalization factor.

Optionally, $E_i$ is the same as $E_j$, and $c_k$ is different from $c_m$; or $E_i$ is different from $E_j$, and $c_k$ is the same as $c_m$; or
$E_i$ is different from $E_j$, and $c_k$ is different from $c_m$; or
$E_i$ is the same as $E_j$, and $c_k$ is the same as $c_m$.

3. The second channel information is a time delay factor, and a form that is of the precoding matrix including the first channel information and the second channel information and that is in time domain is as follows:

$$W(\tau) = \sum_{m=0}^{N-1} e_{i_m} p_m \delta(\tau - \tau_m);$$

where $\tau_m$ is the time delay factor corresponding to an $m^{th}$ vector in the N first vectors.

Herein, for example, the reference signal is a channel state information-reference signal (CSI-RS) on which beamforming is performed. Herein, a beam direction has been formed after precoding processing is performed on each antenna port for the reference signal, and the precoding may be digital beamforming or analog beamforming.

Figure 11:
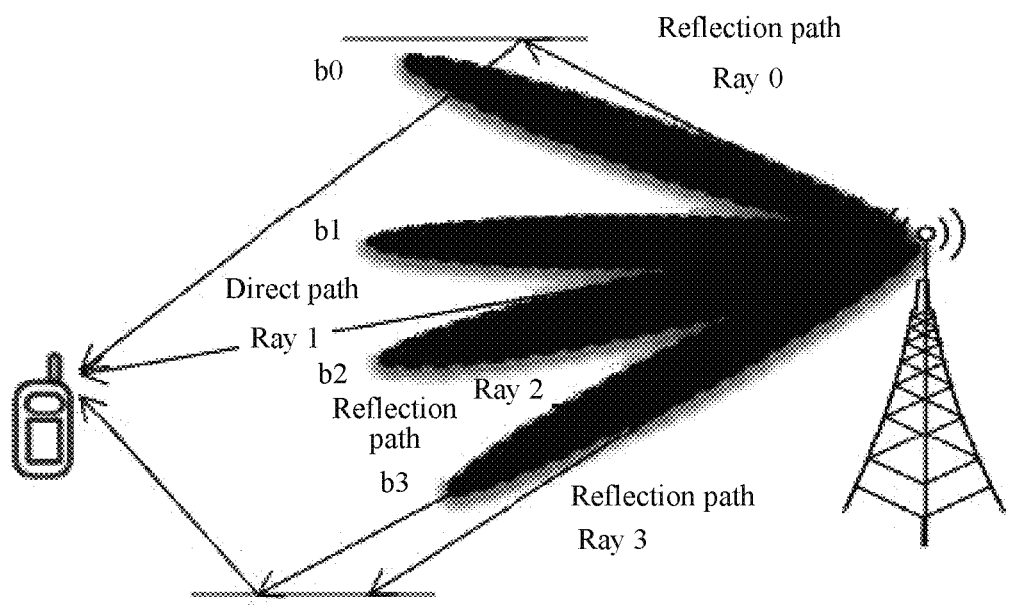
FIG. 11 is a schematic diagram of beams formed by antennas in one polarization direction.

As shown in FIG. 11, four beam directions b0, b1, b2, and b3 respectively correspond to antenna ports: a port 0, a port 1, a port 2, and a port 3.

Figure 12:
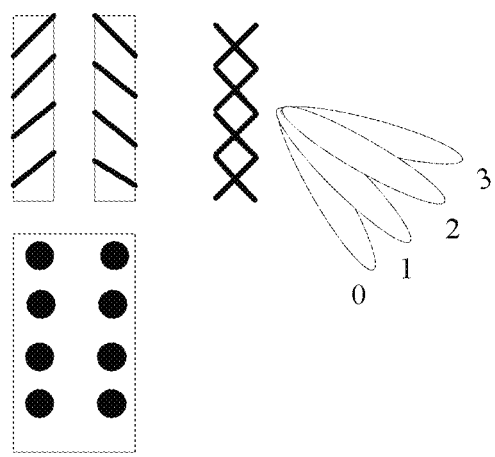
FIG. 12 is a schematic diagram of beams generated by a dual-polarized antenna through precoding.

FIG. 11 shows only beams formed by antennas in one polarization direction. If a dual-polarized antenna is considered, two groups of antennas in two polarization directions each generate a same beam direction. As shown in FIG. 12, one group of four antennas on a left side generate a beam 1, a beam 2, a beam 3, and a beam 4 through precoding and weighting, and correspondingly, the other group of four antennas in a polarization direction on a right side generate a beam 1, a beam 2, a beam 3, and a beam 4 through precoding and weighting. The second device 102 sends CSI-RSs on eight antenna ports in total.

It is assumed that there are four propagation paths from the second device 102 to the first device 101: a direct path: a ray 1, and reflection paths: a ray 0, a ray 2, and a ray 3. The second device 102 transmits four beams for scanning, which are respectively a beam 0, a beam 1, a beam 2, and a beam 3. Because the beam 0, the beam 2, and the beam 3 match the propagation paths better, the first device 101 may receive energy of b0, b2, and b3. Because a beam in the direction b1 has no propagation path, the first device 101 cannot detect energy of the beam.

The first device 101 determines a port 0, a port 2, and a port 3 that correspond to the beams b0, b2, and b3 whose detected energy exceeds a specific threshold, and determines a port 4, a port 6, and a port 7 in the other polarization direction. The first device 101 reports antenna port selection information (namely, the first channel information), and reports amplitude and phase weighting information (namely, the second channel information) on each antenna port.

$W = W_s W_2$, where $$W_s = \begin{bmatrix} e_m & e_n \\ e_m & e_n \end{bmatrix}, e_m$$

is a unit vector, $$e_1 = \begin{bmatrix} 1 \\ 0 \\ 0 \\ 0 \end{bmatrix}, e_2 = \begin{bmatrix} 0 \\ 1 \\ 0 \\ 0 \end{bmatrix}, e_m$$

is a column vector in which an $m^{th}$ element is 1 and all other elements are 0, a dimension of the column vector of $e_m$ is equal to half of a quantity of ports for the reference signal corresponding to $W'_1$.

Channel information feedback manner:

Regardless of Solution 1 or Solution 2, when feeding back channel information, the first device 101 may use different feedback manners for different channel information.

In the following description, a feedback manner of the first channel information, a feedback manner of the second channel information, and a feedback manner of the third channel information are applicable to both Solution 1 and Solution 2, but content of the channel information is different in Solution 1 and Solution 2. A feedback manner of the fourth channel information and a feedback manner of the seventh channel information are applicable to only Solution 1.

Various feedback manners are specifically described below.

The feedback manner includes wideband based feedback or subband based feedback, a feedback period, and analog feedback or feedback after quantization. The feedback manners are described below one by one.

I. Wideband Based Feedback or Subband Based Feedback

The wideband based feedback means that, for entire system bandwidth, channel information is fed back only once in one feedback period.

The subband based feedback means that, for a plurality of subbands preset in system bandwidth, channel information is fed back on each subband in one feedback period.

When the subband based feedback is used, channel information feedback precision is higher, but information overheads are also relatively large. When the wideband based feedback is used, channel information feedback precision is low, and accordingly information overheads are relatively small. The subband based feedback may be used for some channel information that is important to channel feature restoration, or for channel information in which a difference between values of different subbands is relatively large. The wideband based feedback may be used for channel information that is less important to channel feature restoration, or for channel information in which a difference between values of different subbands is small.

Figure 9:
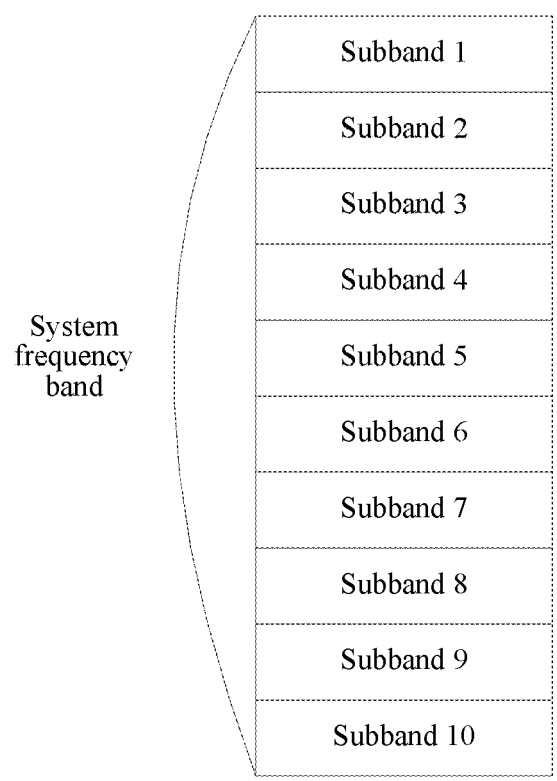
FIG. 9 is a schematic diagram in which a system frequency band is divided into a plurality of subbands.

Referring to FIG. 9, it is assumed that an entire system frequency band is divided in advance into ten subbands: a subband 1 to a subband 10. The subband based feedback means that the first device 101 generates corresponding channel information for each of the ten subbands. The wideband based feedback means that the first device 101 generates one piece of channel information for the entire system frequency band.

II. Feedback Period

Some channel information that is important to channel feature restoration or channel information that changes relatively fast with time may be fed back by using a relatively short feedback period. Channel information that is less important to channel feature restoration or channel information that changes relatively slowly with time may be fed back by using a relatively long feedback period.

III. Analog Feedback or Feedback after Quantization

Some channel information that is important to channel feature restoration may be fed back after being quantized in a high-precision quantization manner, for example, by using a relatively large quantization order. Channel information that is less important to channel feature restoration may be fed back after being quantized in a low-precision quantization manner.

A purpose of using different feedback manners for different channel information is to ensure channel information feedback precision, so that a high-precision precoding matrix can be generated, and to reduce an information feedback amount as much as possible.

In practice, different feedback manners may be used based on different product implementations.

For example, for wideband based feedback or subband based feedback, any feedback manner in Table 3 may be used.

TABLE 3

Feedback manner of wideband based feedback or subband based feedback

| Feedback manner | First channel information | Second channel information | Third channel information | Fourth channel information | Description |
| --- | --- | --- | --- | --- | --- |
| Manner 1 | Wideband based feedback | Subband based feedback | Not fed back | Not fed back | |
| Manner 2 | Subband based feedback | Subband based feedback | Not fed back | Not fed back | Feedback bandwidth for the first channel information is greater than feedback bandwidth for the second channel information |
| Manner 3 | Wideband based feedback | Subband based feedback | Subband based feedback | Not fed back | |
| Manner 4 | Subband based feedback | Subband based feedback | Subband based feedback | Not fed back | Feedback bandwidth for the first channel information is greater than feedback bandwidth for the second channel information and feedback bandwidth for the third channel information |

TABLE 3-continued

Feedback manner of wideband based feedback or subband based feedback

| Feedback manner | First channel information | Second channel information | Third channel information | Fourth channel information | Description |
|---|---|---|---|---|---|
| Manner 5 | Wideband based feedback | Wideband based feedback | Subband based feedback | Not fed back | |
| Manner 6 | Subband based feedback | Subband based feedback | Subband based feedback | Not fed back | Both feedback bandwidth for the first channel information and feedback bandwidth for the second channel information are greater than feedback bandwidth for the third channel information |
| Manner 7 | Wideband based feedback | Subband based feedback | Subband based feedback | Subband based feedback | |
| Manner 8 | Subband based feedback | Subband based feedback | Subband based feedback | Subband based feedback | Feedback bandwidth for the first channel information is greater than feedback bandwidth for the second channel information, feedback bandwidth for the third channel information, and feedback bandwidth for the fourth channel information |
| Manner 9 | Wideband based feedback | Wideband based feedback | Subband based feedback | Subband based feedback | Feedback bandwidth for the first channel information and feedback bandwidth for the second channel information are greater than feedback bandwidth for the third channel information and feedback bandwidth for the fourth channel information |
| Manner 10 | Subband based feedback | Subband based feedback | Subband based feedback | Subband based feedback | |
| Manner 11 | Wideband based feedback | Wideband based feedback | Subband based feedback | Wideband based feedback | |
| Manner 12 | Subband based feedback | Subband based feedback | Subband based feedback | Subband based feedback | Feedback bandwidth for the first channel information, feedback bandwidth for the second channel information, and feedback bandwidth for the fourth channel information are greater than feedback bandwidth for the third channel information |
| Manner 13 | Wideband based feedback | Subband based feedback | Subband based feedback | Wideband based feedback | |
| Manner 14 | Subband based feedback | Subband based feedback | Subband based feedback | Subband based feedback | Feedback bandwidth for the first channel information and feedback bandwidth for the fourth channel information are greater than feedback bandwidth for the second channel information and feedback bandwidth for the third channel information |

For a feedback period, the following optional manners may be used.

Manner 1

A feedback period of the first channel information is longer than a feedback period of the second channel information, and the third channel information and the fourth channel information are not fed back.

Manner 2

A feedback period of the first channel information is longer than a feedback period of the second channel information and a feedback period of the third channel information, and the fourth channel information is not fed back.

Manner 3

A feedback manner of the first channel information and a feedback manner of the second channel information are long-term feedback, and a feedback manner of the third channel information is short-term feedback.

Manner 4

Both a feedback period of the first channel information and a feedback period of the second channel information are longer than a feedback period of the third channel information.

Manner 5

A feedback period of the first channel information is longer than a feedback period of the second channel information, a feedback period of the third channel information, and a feedback period of the fourth channel information.

Manner 6

A feedback period of the first channel information and a feedback period of the second channel information are longer than a feedback period of the third channel information and a feedback period of the fourth channel information.

Manner 7

A feedback period of the first channel information, a feedback period of the second channel information, and a feedback period of the fourth channel information are longer than a feedback period of the third channel information.

Manner 8

A feedback period of the first channel information and a feedback period of the fourth channel information are longer than a feedback period of the second channel information and a feedback period of the third channel information.

In addition to feeding back the foregoing channel information, the first device 101 may measure the reference signal sent by the second device 102, to obtain fifth channel information and/or sixth channel information, and send the information to the second device 102.

The fifth channel information includes information used to indicate an amount of spatially multiplexed data from the second device 102 to the first device 101, for example, an RI in an LTE system. The sixth channel information includes information used to indicate channel quality of a channel from the second device 102 to the first device 101, for example, a CQI in the LTE system. A feedback manner of the fifth channel information and a feedback manner of the sixth channel information are applicable to both Solution 1 and Solution 2.

When the third channel information and the fourth channel information are not fed back, the following channel information feedback manners may be used.

The first channel information and the fifth channel information are fed back in a first subframe by using a first period, and the second channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, and the sixth channel information is fed back in a third subframe by using a third period, where the first period is not less than the second period, and the second period is not less than the third period; or the fifth channel information is fed back in a first subframe by using a first period, the first channel information is fed back in a second subframe by using a second period, the second channel information is fed back in a third subframe by using a third period, and the sixth channel information is fed back in a fourth subframe by using a fourth period, where the first period is not less than the second period, the second period is not less than the third period, and the third period is not less than the fourth period.

When the fourth channel information is not fed back, the following channel information feedback manners may be used.

The first channel information and the fifth channel information are fed back in a first subframe by using a first period, the second channel information and the third channel information are fed back in a second subframe by using a second period, and the sixth channel information is fed back in a third subframe by using a third period, where the first period is not less than the second period, and the second period is not less than the third period; or the first channel information and the fifth channel information are fed back in a first subframe by using a first period, and the second channel information, the third channel information, and the sixth channel information are fed back in a second subframe by using a second period, where the first period is not less than the second period; or the first channel information, the second channel information, and the fifth channel information are fed back in a first subframe by using a first period, and the third channel information and the sixth channel information are fed back in a second subframe by using a second period, where the first period is not less than the second period; or the first channel information and the fifth channel information are fed back in a first subframe by using a first period, the second channel information is fed back in a second subframe by using a second period, and the third channel information and the sixth channel information are fed back in a third subframe by using a third period, where the first period is not less than the second period, and the second period is not less than the third period; or the first channel information and the fifth channel information are fed back in a first subframe by using a first period, the second channel information is fed back in a second subframe by using a second period, the third channel information is fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information is fed back in a second subframe by using a second period, the second channel information is fed back in a third subframe by using a third period, the third channel information is fed back in a fourth subframe by using a fourth period, and the sixth channel information is fed back in a fifth subframe by using a fifth period, where the first period is not less than the second period, the second period is not less than the third period, the third period is not less than the fourth period, and the fourth period is not less than the fifth period.

When both the third channel information and the fourth channel information are fed back, the following channel information feedback manners may be used.

The first channel information, the fourth channel information, and the fifth channel information are fed back in a first subframe by using a first period, the second channel information and the third channel information are fed back in a second subframe by using a second period, and the sixth channel information is fed back in a third subframe by using a third period, where the first period is not less than the second period, and the second period is not less than the third period; or the first channel information, the fourth channel information, and the fifth channel information are fed back in a first subframe by using a first period, and the second channel information, the third channel information, and the sixth channel information are fed back in a second subframe by using a second period, where the first period is not less than the second period; or the fifth channel information is fed back in a first subframe by using a first period, the first channel information and the fourth channel information are fed back in a second subframe by using a second period, the second channel information and the third channel information are fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information and the fourth channel information are fed back in a second subframe by using a second period, and the second channel information, the third channel information, and the sixth channel information are fed back in a third subframe by using a third period, where the first period is not less than the second period, and the second period is not less than the third period; or the fifth channel information, the first channel information, the second channel information, and the fourth channel information are fed back in a first subframe by using a first period, and the third channel information and the sixth channel information are fed back in a second subframe by using a second period, where the first period is not less than the second period; or the fifth channel information, the first channel information, and the fourth channel information are fed back in a first subframe by using a first period, the second channel information is fed back in a second subframe by using a second period, and the third channel information and the sixth channel information are fed back in a third subframe by using a third period, where the first period is not less than the second period, and the second period is not less than the third period; or the fifth channel information, the first channel information, and the fourth channel information are fed back in a first subframe by using a first period, the second channel information is fed back in a second subframe by using a second period, the third channel information is fed back in a third subframe by using a third period, and the sixth channel information is fed back in a fourth subframe by using a fourth period, where the first period is not less than the second period, the second period is not less than the third period, and the third period is not less than the fourth period; or the fifth channel information is fed back in a first subframe by using a first period, the first channel information and the fourth channel information are fed back in a second subframe by using a second period, the second channel information is fed back in a third subframe by using a third period, the third channel information is fed back in a fourth subframe by using a fourth period, and the sixth channel information is fed back in a fifth subframe by using a fifth period, where the first period is not less than the second period, the second period is not less than the third period, the third period is not less than the fourth period, and the fourth period is not less than the fifth period.

Figure 10A:
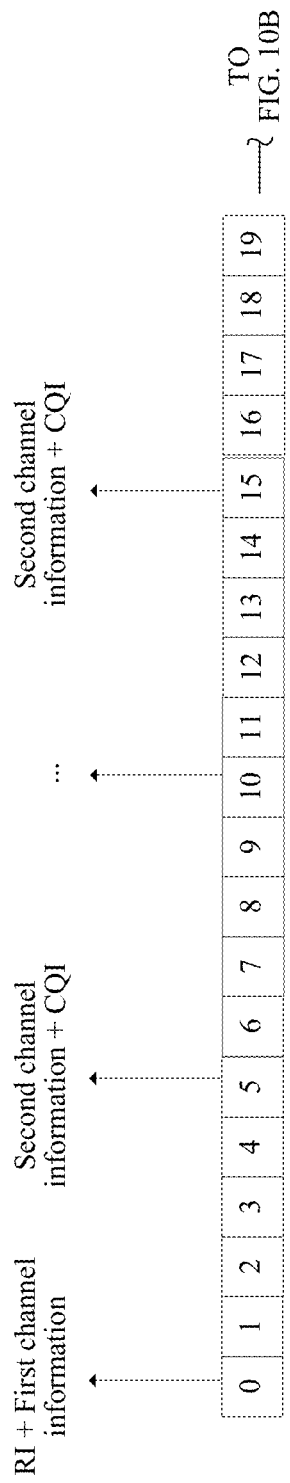
FIG. 10A and FIG. 10B are a schematic diagram of a channel information feedback manner according to an embodiment of the present invention.
Figure 10B:
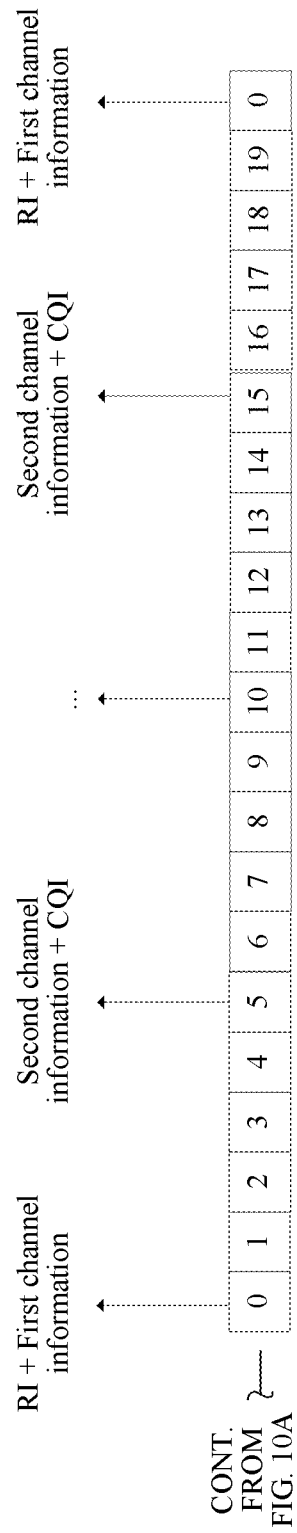

FIG. 10A and FIG. 10B show a possible channel information feedback manner.

For analog feedback or quantization feedback, a flexible feedback manner may be used for the second channel information.

For example, the second channel information includes third subchannel information, and the third subchannel information is used to indicate the first factor. The third subchannel information is not quantized. Alternatively, first quantization is performed on the third subchannel information, and a quantization order of the first quantization is not greater than a preset first-quantization order threshold.

Optionally, the second channel information includes fourth subchannel information, and the fourth subchannel information is used to indicate the second factor. The fourth subchannel information is not quantized. Alternatively, second quantization is performed on the fourth subchannel information, and a quantization order of the second quantization is not greater than a preset second-quantization order threshold.

Figure 13:
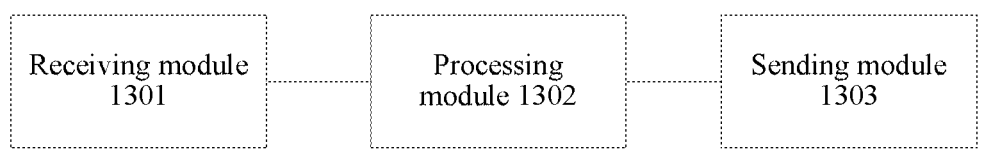
FIG. 13 is a schematic structural diagram of a first device according to an embodiment of the present invention.

FIG. 13 is a schematic structural diagram of a first device according to an embodiment of the present invention. As shown in FIG. 13, the first device includes a receiving module 1301, a processing module 1302, and a sending module 1303.

In an optional implementation, the receiving module 1301 is configured to receive a reference signal sent by a second device, where the reference signal is sent on S antenna ports, the S antenna ports belong to H reference signal resource port groups, and S and H are integers greater than or equal to 1;

the processing module 1302 is configured to measure the reference signal to obtain first channel information and second channel information; and the sending module 1303 is configured to send the first channel information and the second channel information to the second device.

The first channel information includes identification information of M first vectors, where M is an integer not less than 2.

The second channel information includes information about a weighted combination factor used for performing weighted combination on N first vectors in the M first vectors, where N is a positive integer not greater than M.

The weighted combination factor includes a first factor and/or a second factor.

The first factor is an amplitude factor, and the second factor is a phase factor or a time delay factor.

The first channel information and the second channel information are used to constitute a precoding matrix.

A dimension of the first vector is a quantity of antenna ports in each reference signal resource port group, or a dimension of the first vector is half of a quantity of antenna ports in each reference signal resource port group.

In this optional implementation, for another optional implementation of the first device, refer to the first device 101 in Solution 1. The receiving module 1301 is configured to perform a receiving operation of the first device 101, the processing module 1302 is configured to perform a processing operation of the first device 101, and the sending module 1303 is configured to perform a sending operation of the first device 101.

In another optional implementation, the receiving module 1301 is configured to receive a reference signal sent by a second device;

the processing module 1302 is configured to measure the reference signal to obtain first channel information and second channel information; and the sending module 1303 is configured to send the first channel information and the second channel information to the second device.

The first channel information includes identification information of N antenna ports in M antenna ports for the reference signal, where M is an integer not less than 2, and N is a positive integer not greater than M.

The second channel information includes information about a weighted combination factor used for performing weighted combination on the N antenna ports.

The weighted combination factor includes a first factor and/or a second factor.

The first factor is an amplitude factor, and the second factor is a phase factor or a time delay factor.

The first channel information and the second channel information are used to constitute a precoding matrix.

In this optional implementation, for another optional implementation of the first device, refer to the first device 101 in Solution 2. The receiving module 1301 is configured to perform a receiving operation of the first device 101, the processing module 1302 is configured to perform a processing operation of the first device 101, and the sending module 1303 is configured to perform a sending operation of the first device 101.

Optionally, the receiving module 1301 may be implemented by a receiver, the processing module 1302 may be implemented by a processor, and the sending module 1303 may be implemented by a transmitter.

Figure 14:
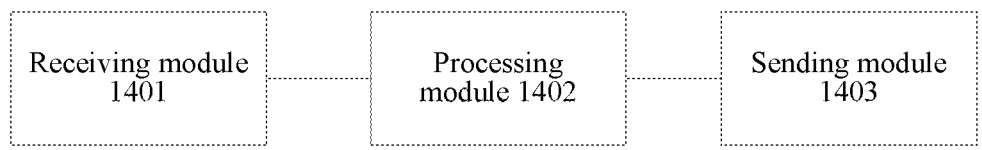
FIG. 14 is a schematic structural diagram of a second device according to an embodiment of the present invention.

FIG. 14 is a schematic structural diagram of a second device according to an embodiment of the present invention. As shown in FIG. 14, the second device includes a receiving module 1401, a processing module 1402, and a sending module 1403.

In an optional implementation, the sending module 1403 is configured to send a reference signal to a first device, where the reference signal is sent on S antenna ports, the S antenna ports belong to H reference signal resource port groups, and S and H are integers greater than or equal to 1;

the receiving module 1401 is configured to receive first channel information and second channel information from the first device, where the first channel information and the second channel information are obtained by the first device by measuring the received reference signal, where the first channel information includes identification information of M first vectors, where M is an integer not less than 2;

the second channel information includes information about a weighted combination factor used for performing weighted combination on N first vectors in the M first vectors, where N is a positive integer not greater than M;

the weighted combination factor includes a first factor and/or a second factor;

the first factor is an amplitude factor, and the second factor is a phase factor or a time delay factor; and a dimension of the first vector is a quantity of antenna ports in each reference signal resource port group, or a dimension of the first vector is half of a quantity of antenna ports in each reference signal resource port group; and the processing module 1402 is configured to generate the precoding matrix based on the first channel information and the second channel information.

The sending module 1403 is further configured to send data to the first device based on the precoding matrix generated by the processing module.

In this optional implementation, for another optional implementation of the second device, refer to the second device 102 in Solution 1. The receiving module 1401 is configured to perform a receiving operation of the second device 102, the processing module 1402 is configured to perform a processing operation of the second device 102, and the sending module 1403 is configured to perform a sending operation of the second device 102.

In another optional implementation, the sending module 1403 is configured to send a reference signal to a first device;

the receiving module 1401 is configured to receive first channel information and second channel information from the first device, where the first channel information and the second channel information are obtained by the first device by measuring the received reference signal, where the first channel information includes identification information of N antenna ports in M antenna ports for the reference signal, where M is an integer not less than 2, and N is a positive integer not greater than M;

the second channel information includes information about a weighted combination factor used for performing weighted combination on the N antenna ports;

the weighted combination factor includes a first factor and/or a second factor; and the first factor is an amplitude factor, and the second factor is a phase factor or a time delay factor; and the processing module 1402 is configured to generate a precoding matrix based on the first channel information and the second channel information.

The sending module 1403 is further configured to send data to the first device based on the precoding matrix generated by the processing module 1402.

In this optional implementation, for another optional implementation of the second device, refer to the second device 102 in Solution 2. The receiving module 1401 is configured to perform a receiving operation of the second device 102, the processing module 1402 is configured to perform a processing operation of the second device 102, and the sending module 1403 is configured to perform a sending operation of the second device 102.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A first device, comprising:
   a processor;
   a memory, configured to store at least one computer instruction which, when executed by the processor, cause the processor to perform following operations:
   receiving a reference signal on which beamforming is performed sent by a second device;
   measuring the reference signal to obtain first channel information and second channel information; and
   sending the first channel information and the second channel information to the second device, wherein
   the first channel information comprises identification information of N antenna ports in M antenna ports for the reference signal, wherein M is an integer not less than 2, and N is a positive integer not greater than M;
   the second channel information comprises information about a weighted combination factor used for performing weighted combination on the N antenna ports;
   the weighted combination factor comprises a amplitude factor and a phase factor; and
   the first channel information and the second channel information are used to constitute a precoding matrix.

2. The first device according to claim 1, wherein the processor is further configured to measure the reference signal to obtain third channel information; and
   the sending module is further configured to send the third channel information to the second device, wherein the third channel information comprises a phase difference between two groups of antenna ports obtained by grouping the M antenna ports; and
   the third channel information is also used to constitute the precoding matrix.

3. The first device according to claim 1, wherein the weighted combination factor is a product of the amplitude factor and the phase factor.

4. The first device according to claim 3, wherein the amplitude factor is selected from a amplitude factor set and the phase factor is selected from a phase factor set.

5. The first device according to claim 1, wherein a feedback manner of the first channel information is bandwidth based feedback, and a feedback manner of the second channel information is subband based feedback.

6. A second device, comprising:
   a processor;
   a memory, configured to store at least one computer instructions which, when executed by the processor, cause the processor to perform following operations:
   sending a reference signal on which beamforming is performed to a first device;
   receiving first channel information and second channel information from the first device, wherein the first channel information and the second channel information are obtained by the first device by measuring the received reference signal, wherein
   the first channel information comprises identification information of N antenna ports in M antenna ports for the reference signal, wherein M is an integer not less than 2, and N is a positive integer not greater than M;
   the second channel information comprises information about a weighted combination factor used for performing weighted combination on the N antenna ports;
   the weighted combination factor comprises a amplitude factor and a phase factor; and
   generating a precoding matrix based on the first channel information and the second channel information, wherein
   sending data to the first device based on the precoding matrix generated by the processing module.

7. The second device according to claim 6, wherein the processor is further configured to receive third channel information from the first device, wherein the third channel information is obtained by the first device by measuring the reference signal, wherein
   the third channel information comprises a phase difference between two groups of antenna ports obtained by grouping the M antenna ports; and
   the processing module is specifically configured to generate the precoding matrix based on the first channel information, the second channel information, and the third channel information.

8. The second device according to claim 6, The first device according to claim 1, wherein the weighted combination factor is a product of the amplitude factor and the phase factor.

9. The second device according to claim 8, wherein the amplitude factor is selected from amplitude factor set and the phase factor is selected from a phase factor set.

10. The second device according to claim 1, wherein a feedback manner of the first channel information is bandwidth based feedback, and a feedback manner of the second channel information is subband based feedback.

11. A channel information sending method, comprising:
    receiving, by a first device, a reference signal on which beamforming is performed sent by a second device;

measuring, by the first device, the received reference signal to obtain first channel information and second channel information; and sending, by the first device, the first channel information and the second channel information to the second device, wherein the first channel information comprises identification information of N antenna ports in M antenna ports for the reference signal, wherein M is an integer not less than 2, and N is a positive integer not greater than M;

the second channel information comprises information about a weighted combination factor used for performing weighted combination on the N antenna ports;

the weighted combination factor comprises a amplitude factor and a phase factor;

the first channel information and the second channel information are used to constitute a precoding matrix.

12. The method according to claim 11, further comprising:

measuring, by the first device, the reference signal to obtain third channel information; and sending, by the first device, the third channel information to the second device, wherein the third channel information comprises a phase difference between two groups of antenna ports obtained by grouping the M antenna ports; and the third channel information is also used to constitute the precoding matrix.

13. The method according to claim 11, wherein the weighted combination factor is a product of the amplitude factor and the phase factor.

14. The method according to claim 13, wherein the amplitude factor is selected from a amplitude factor set and the phase factor is selected from a phase factor set.

15. The method according to claim 11, wherein a feedback manner of the first channel information is bandwidth based feedback, and a feedback manner of the second channel information is subband based feedback.

16. A data sending method, comprising:

sending, by a second device, a reference signal on which beamforming is performed to a first device;

receiving, by the second device, first channel information and second channel information from the first device, wherein the first channel information and the second channel information are obtained by the first device by measuring the received reference signal, wherein the first channel information comprises identification information of N antenna ports in M antenna ports for the reference signal, wherein M is an integer not less than 2, and N is a positive integer not greater than M;

the second channel information comprises information about a weighted combination factor used for performing weighted combination on the N antenna ports;

the weighted combination factor comprises a amplitude factor and a phase factor; and generating, by the second device, a precoding matrix based on the first channel information and the second channel information; and sending, by the second device, data to the first device based on the generated precoding matrix.

17. The method according to claim 16, further comprising:

receiving, by the second device, third channel information from the first device, wherein the third channel information is obtained by the first device by measuring the reference signal, wherein the third channel information comprises a phase difference between two groups of antenna ports obtained by grouping the M antenna ports; and the generating, by the second device, the precoding matrix based on the first channel information and the second channel information comprises: generating, by the second device, the precoding matrix based on the first channel information, the second channel information, and the third channel information.

18. The method according to claim 16, wherein the weighted combination factor is a product of the amplitude factor and the phase factor.

19. The method according to claim 18, wherein the amplitude factor is selected from a amplitude factor set and the phase factor is selected from a phase factor set.

20. The method according to claim 16, wherein a feedback manner of the first channel information is bandwidth based feedback, and a feedback manner of the second channel information is subband based feedback.

21. A non-transitory computer readable storage medium, configured to store a computer program instruction which, when executed by a processor, cause the processor to perform operations comprising:

receiving, a reference signal on which beamforming is performed;

measuring, the received reference signal to obtain first channel information and second channel information; and sending, the first channel information and the second channel information, wherein the first channel information comprises identification information of N antenna ports in M antenna ports for the reference signal, wherein M is an integer not less than 2, and N is a positive integer not greater than M;

the second channel information comprises information about a weighted combination factor used for performing weighted combination on the N antenna ports;

the weighted combination factor comprises a amplitude factor and a phase factor;

the first channel information and the second channel information are used to constitute a precoding matrix.

22. A non-transitory computer readable storage medium, configured to store a computer program instruction which, when executed by a processor, cause the processor to perform operations comprising:

sending, a reference signal on which beamforming is performed;

receiving, first channel information and second channel information, wherein the first channel information and the second channel information are obtained by measuring the received reference signal, wherein the first channel information comprises identification information of N antenna ports in M antenna ports for the reference signal, wherein M is an integer not less than 2, and N is a positive integer not greater than M;

the second channel information comprises information about a weighted combination factor used for performing weighted combination on the N antenna ports;

the weighted combination factor comprises a amplitude factor and a phase factor;

generating, a precoding matrix based on the first channel information and the second channel information; and sending, data based on the generated precoding matrix.

23. A device, comprising:
a processor;
a memory, configured to store at least one computer instruction which, when executed by the processor, cause the processor to:
receive a beamformed reference signal;
measure the reference signal to obtain a first channel information and a second channel information; and
send the first channel information and the second channel information, wherein the first channel information comprises identification information of N antenna ports in M antenna ports for the reference signal, wherein M is an integer not less than 2, and N is a positive integer not greater than M, the second channel information comprises information about a weighted combination factor used for performing weighted combination on the N antenna ports, the weighted combination factor comprises a amplitude factor and a phase factor, and the first channel information and the second channel information are used to constitute a precoding matrix.

* * * * *